United States Patent
Amano

(10) Patent No.: US 8,179,606 B2
(45) Date of Patent: May 15, 2012

(54) ZOOM LENS FOR PROJECTION AND PROJECTION-TYPE DISPLAY DEVICE

(75) Inventor: Masaru Amano, Saitama (JP)

(73) Assignee: Fujifilm Corporation, Tokyo (JP)

( * ) Notice: Subject to any disclaimer, the term of this patent is extended or adjusted under 35 U.S.C. 154(b) by 76 days.

(21) Appl. No.: 12/939,491

(22) Filed: Nov. 4, 2010

(65) Prior Publication Data

US 2011/0109975 A1    May 12, 2011

(30) Foreign Application Priority Data

Nov. 9, 2009   (JP) ................ 2009-256587

(51) Int. Cl.
*G02B 9/00*     (2006.01)
*G02B 9/62*     (2006.01)

(52) U.S. Cl. ............ 359/649; 359/761

(58) Field of Classification Search .......... 359/649, 359/761
See application file for complete search history.

(56) References Cited

U.S. PATENT DOCUMENTS 6,639,737 B2 * 10/2003 Yasui et al. ............. 359/761

FOREIGN PATENT DOCUMENTS

JP    2007-240731    9/2007
JP    2007-304268    11/2007

* cited by examiner

*Primary Examiner* — William Choi
(74) *Attorney, Agent, or Firm* — Young & Thompson

(57) ABSTRACT

A zoom lens for projection includes negative first group $G_1$, positive second group $G_2$, positive third group $G_3$, negative fourth group $G_4$, positive fifth group $G_5$, and positive sixth group $G_6$, arranged from the magnification side of the zoom lens. The reduction side of the zoom lens is telecentric. When the magnification is changed, the first group $G_1$ and the sixth group $G_6$ are fixed, and the second through fifth groups $G_2$ through $G_5$ move. The fourth group $G_4$ is a negative lens having a concave surface facing the magnification side, and the fifth group $G_5$ includes at least two positive lenses and at least two negative lenses. Further, the following formula (1) is satisfied:

$$-5.0 \leq f4/fw \leq -1.2 \qquad (1),$$

where f4: the focal length of the fourth group; and
fw: the focal length of the entire system of the zoom lens at a wide angle end.

8 Claims, 17 Drawing Sheets

EXAMPLE 1
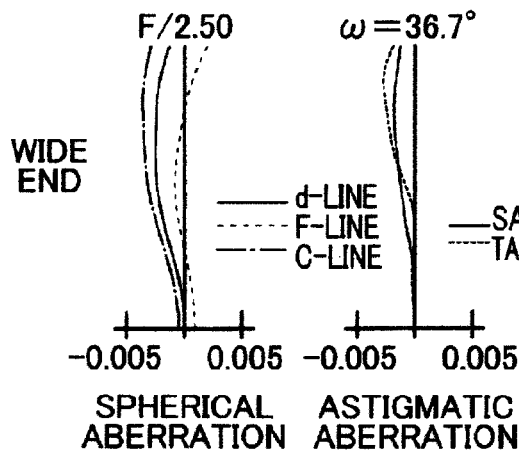
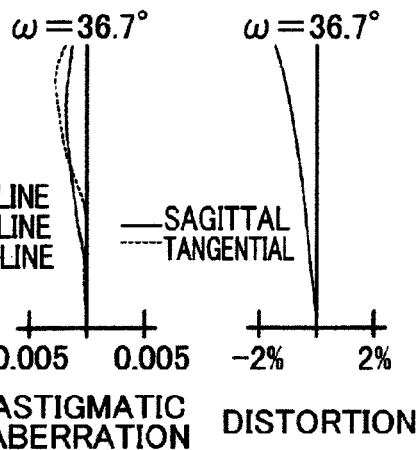
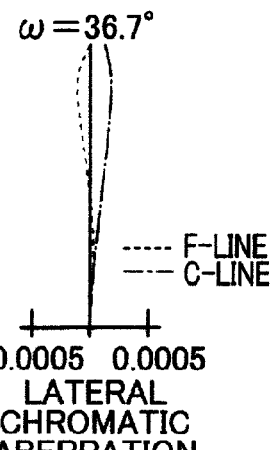
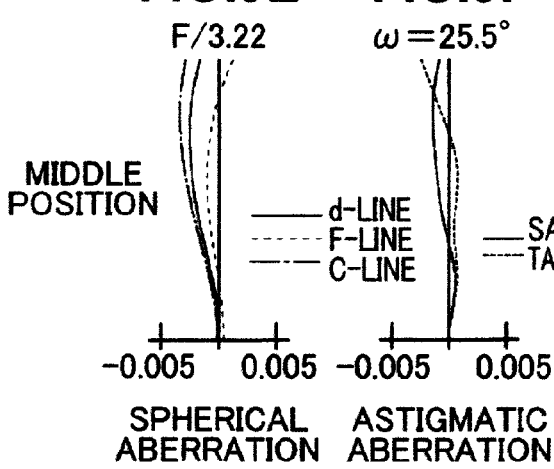
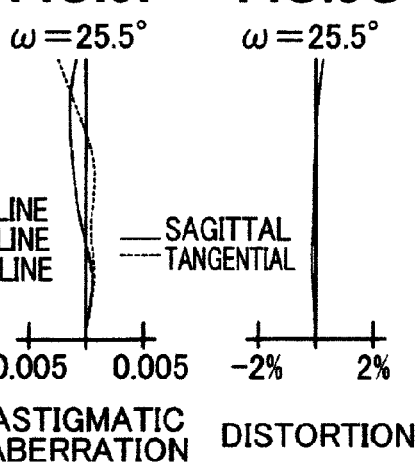
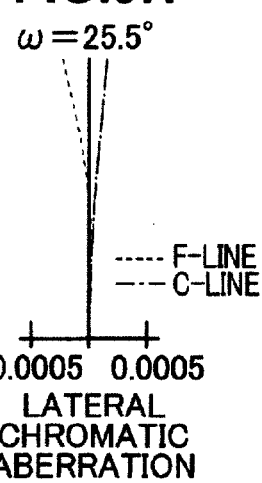
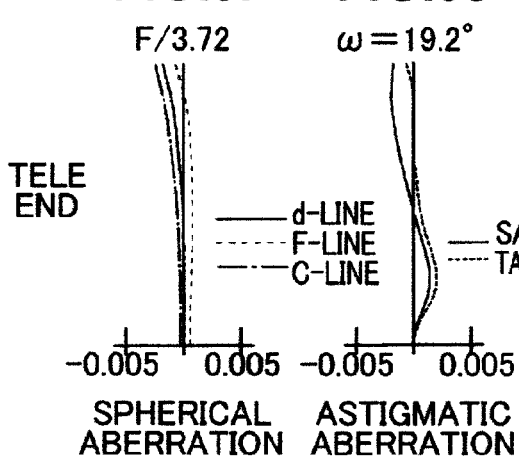
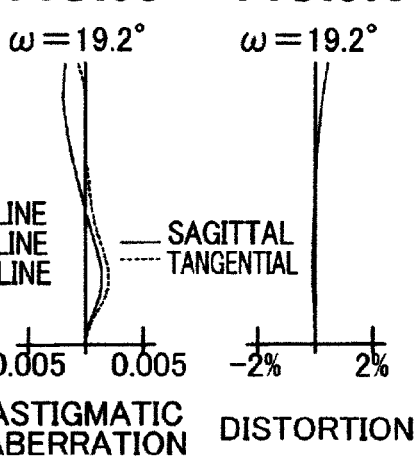
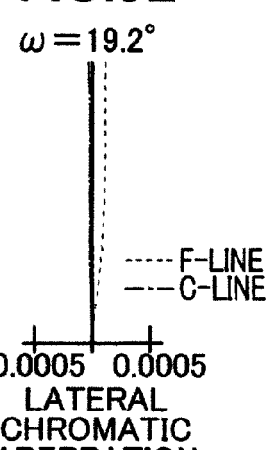

EXAMPLE 2

FIG.10A F/2.50 — WIDE END — SPHERICAL ABERRATION (d-LINE, F-LINE, C-LINE), −0.005 to 0.005

FIG.10B ω=39.3° — ASTIGMATIC ABERRATION (SAGITTAL, TANGENTIAL), −0.005 to 0.005

FIG.10C ω=39.3° — DISTORTION, −2% to 2%

FIG.10D ω=39.3° — LATERAL CHROMATIC ABERRATION (F-LINE, C-LINE), −0.0005 to 0.0005

FIG.10E F/3.37 — MIDDLE POSITION — SPHERICAL ABERRATION (d-LINE, F-LINE, C-LINE), −0.005 to 0.005

FIG.10F ω=26.8° — ASTIGMATIC ABERRATION (SAGITTAL, TANGENTIAL), −0.005 to 0.005

FIG.10G ω=26.8° — DISTORTION, −2% to 2%

FIG.10H ω=26.8° — LATERAL CHROMATIC ABERRATION (F-LINE, C-LINE), −0.0005 to 0.0005

FIG.10I F/3.80 — TELE END — SPHERICAL ABERRATION (d-LINE, F-LINE, C-LINE), −0.005 to 0.005

FIG.10J ω=19.3° — ASTIGMATIC ABERRATION (SAGITTAL, TANGENTIAL), −0.005 to 0.005

FIG.10K ω=19.3° — DISTORTION, −2% to 2%

FIG.10L ω=19.3° — LATERAL CHROMATIC ABERRATION (F-LINE, C-LINE), −0.0005 to 0.0005

EXAMPLE 3
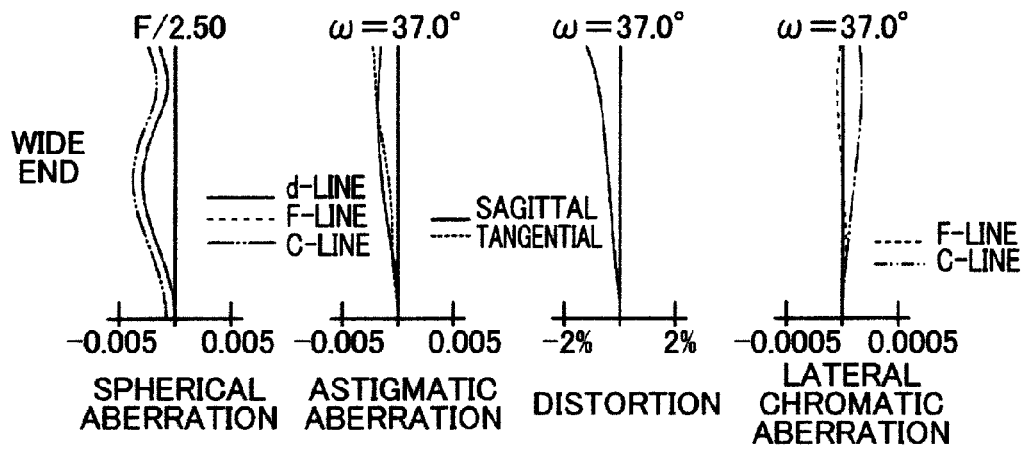
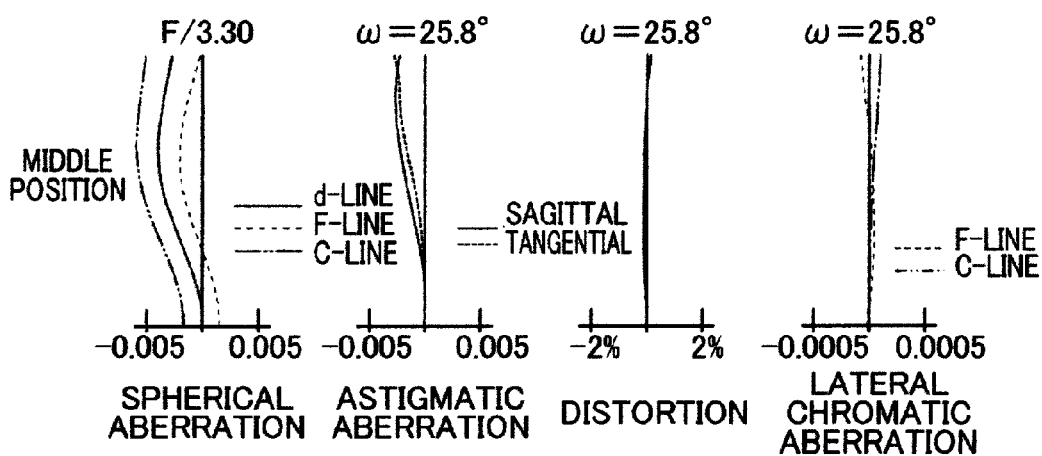
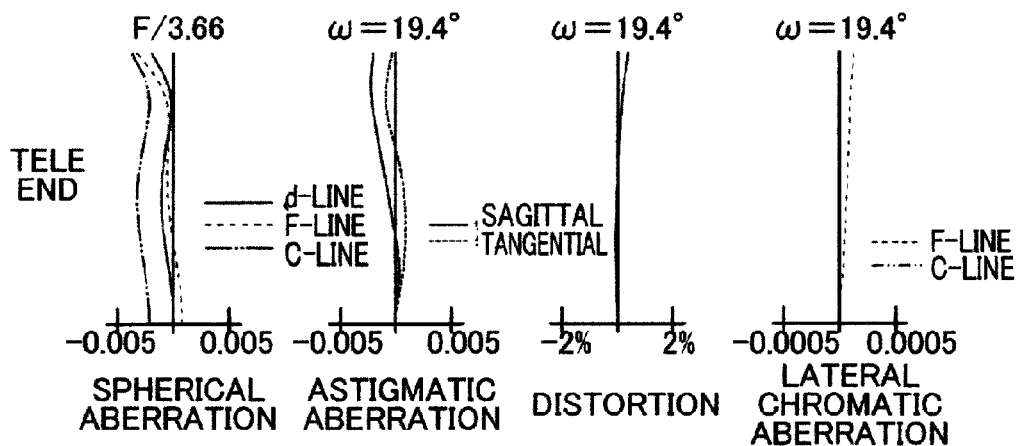

EXAMPLE 4
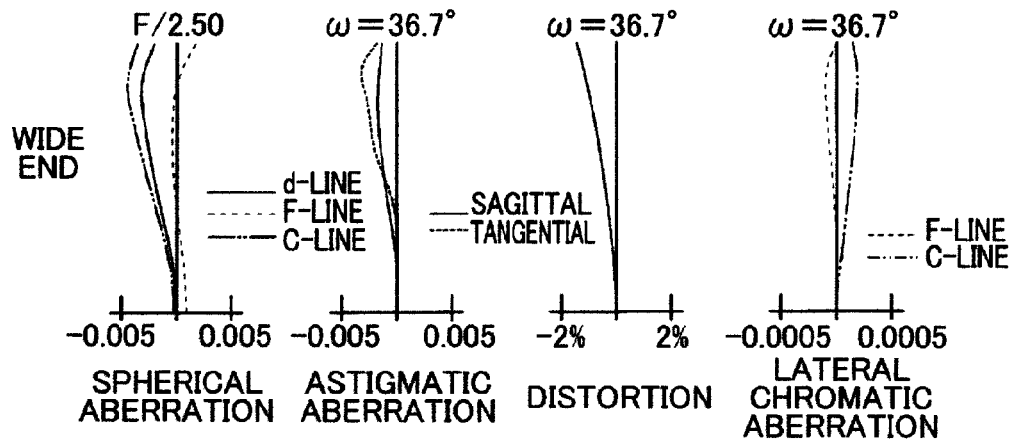
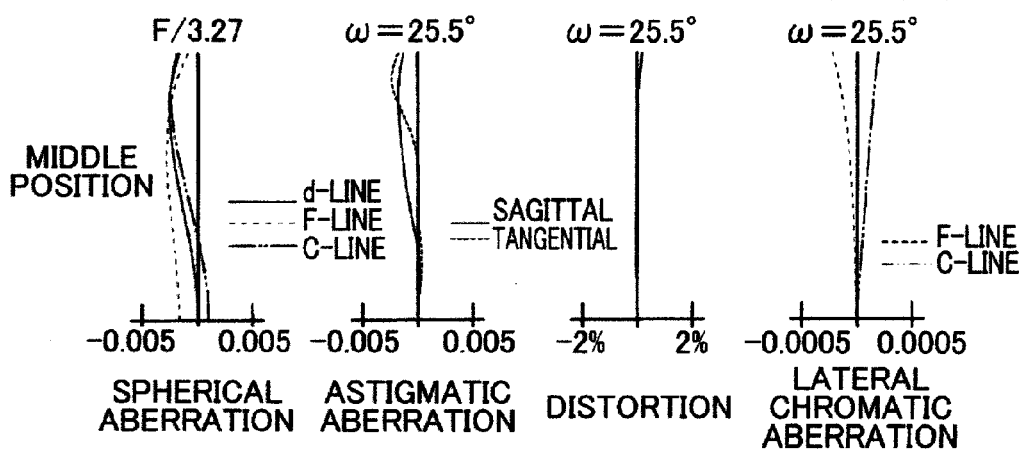
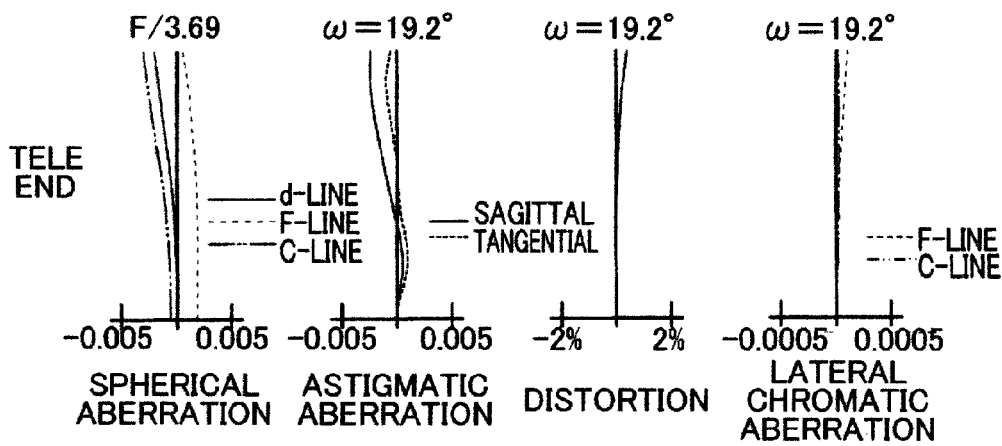

EXAMPLE 5
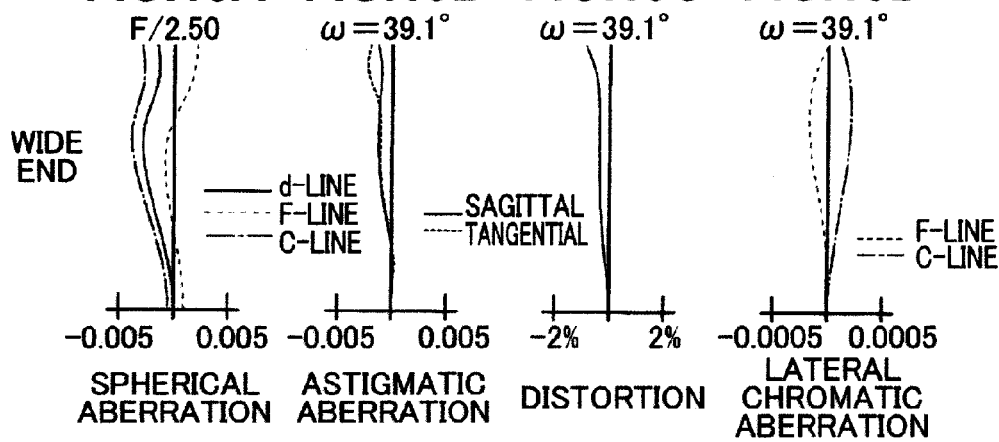
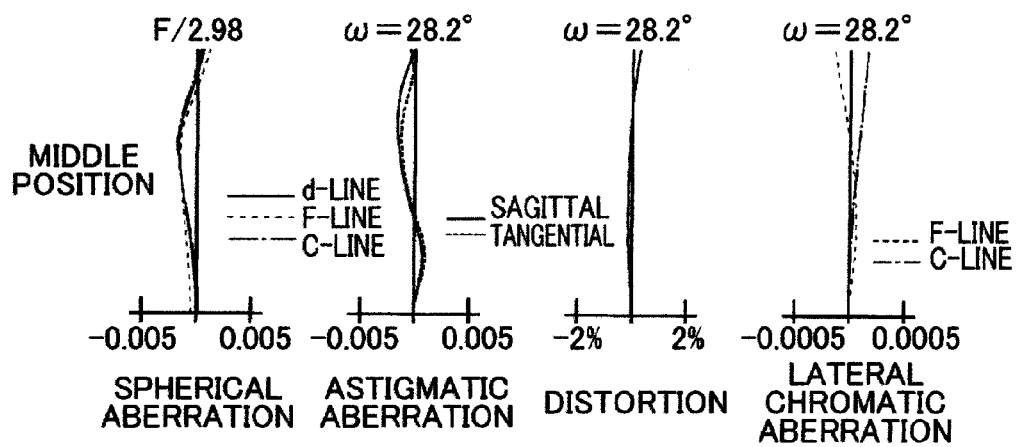
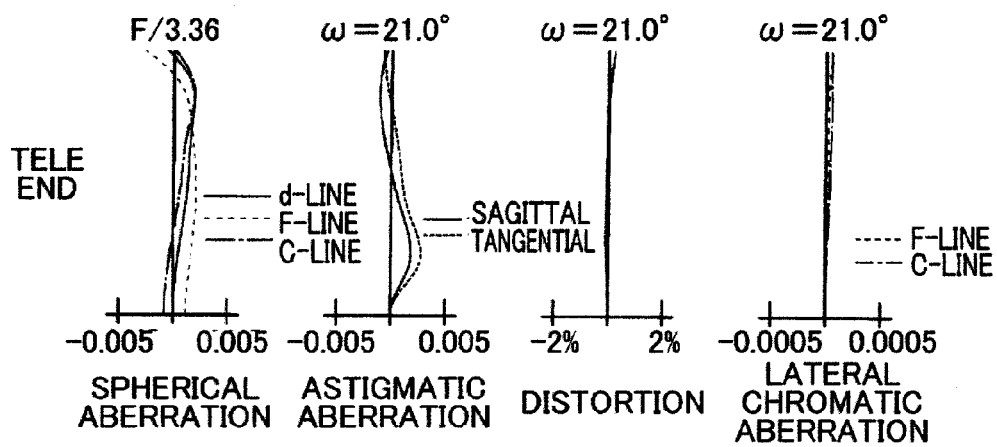

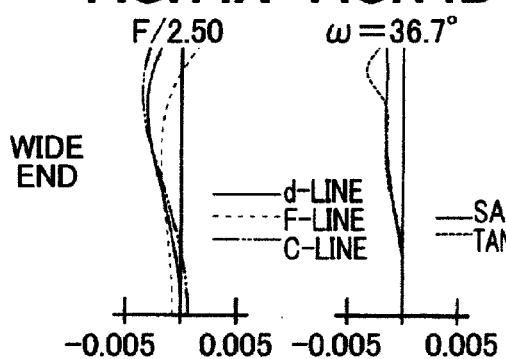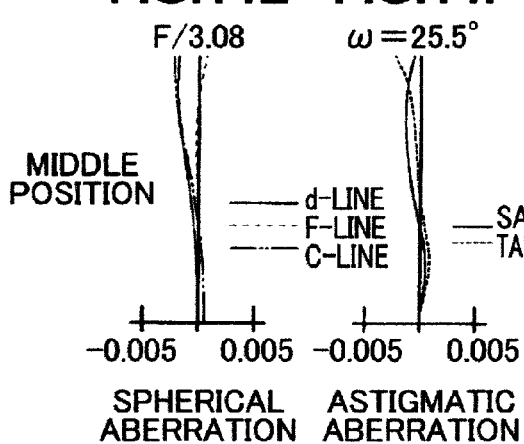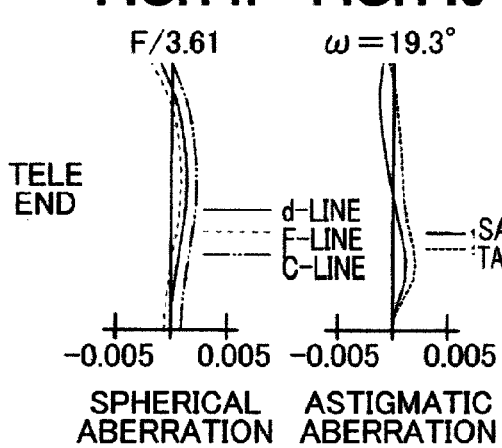

EXAMPLE 7
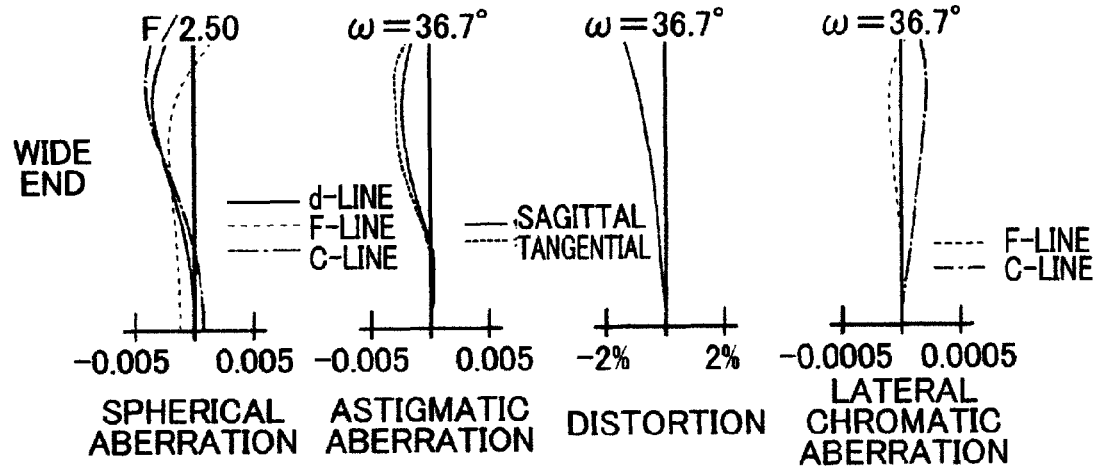
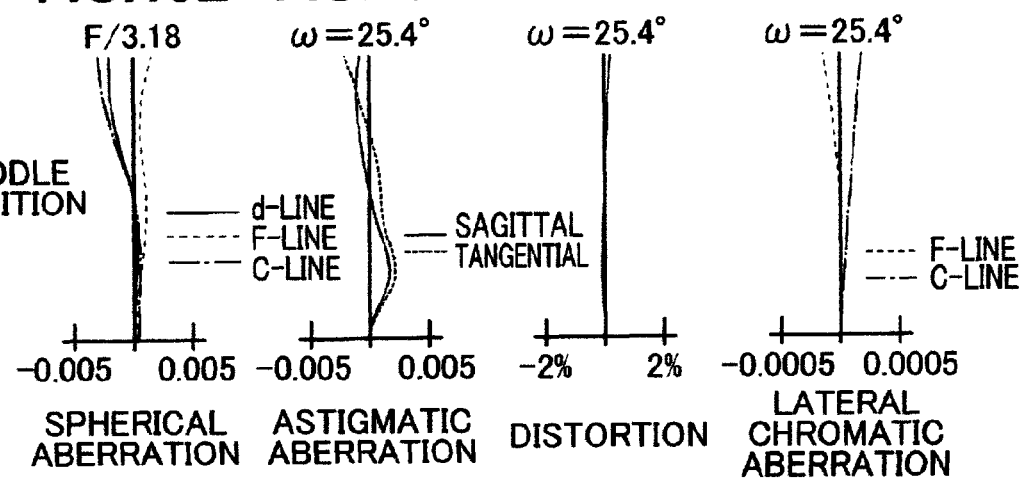
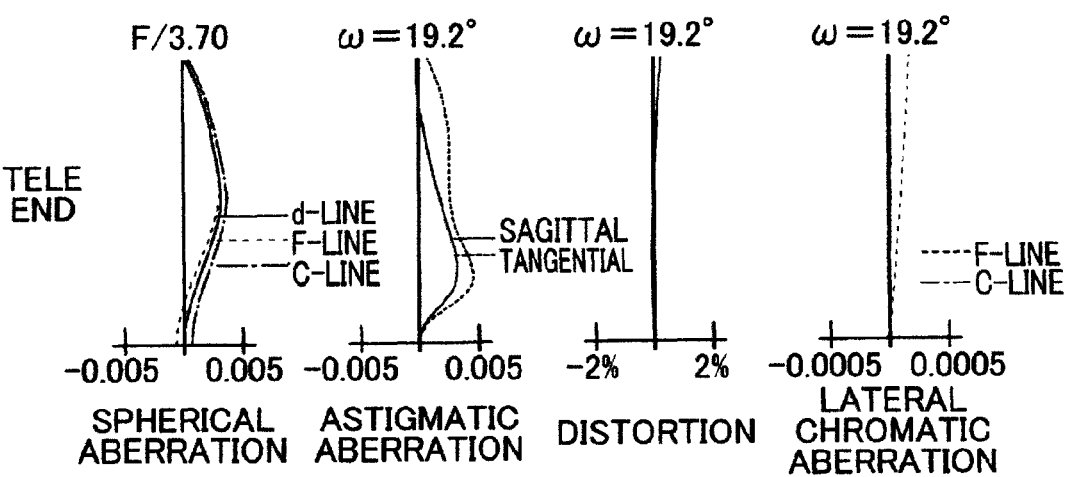

EXAMPLE 8

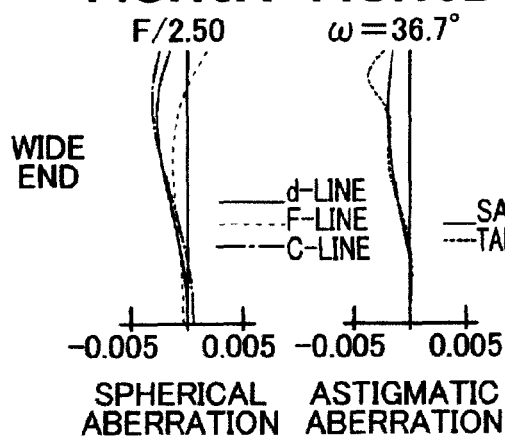

FIG.16A WIDE END F/2.50 SPHERICAL ABERRATION
FIG.16B ω=36.7° ASTIGMATIC ABERRATION
FIG.16C ω=36.7° DISTORTION
FIG.16D ω=36.7° LATERAL CHROMATIC ABERRATION

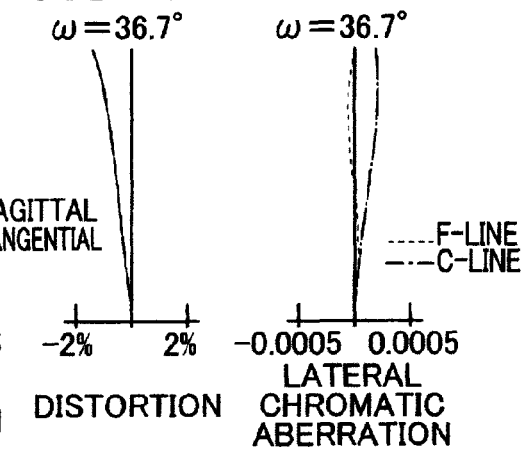

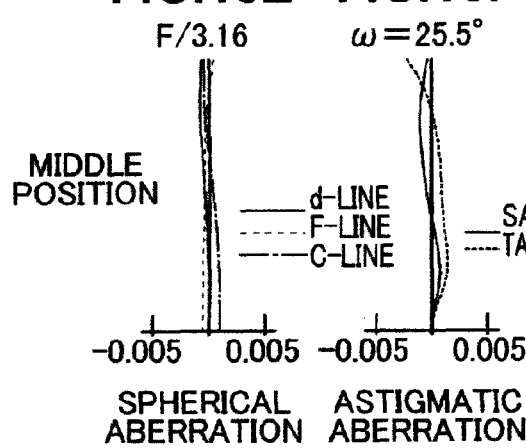

FIG.16E MIDDLE POSITION F/3.16 SPHERICAL ABERRATION
FIG.16F ω=25.5° ASTIGMATIC ABERRATION
FIG.16G ω=25.5° DISTORTION
FIG.16H ω=25.5° LATERAL CHROMATIC ABERRATION

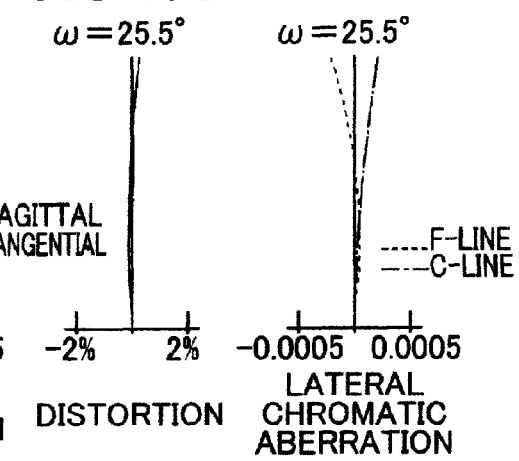

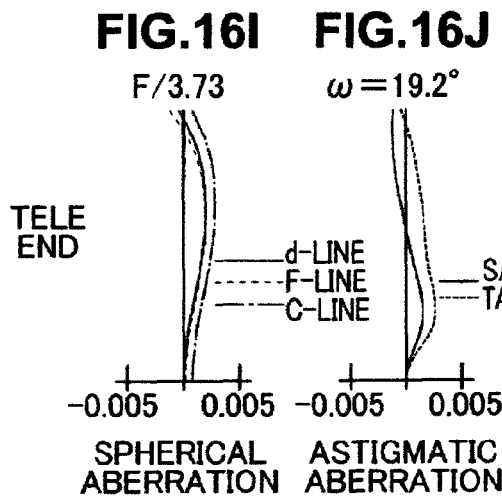

FIG.16I TELE END F/3.73 SPHERICAL ABERRATION
FIG.16J ω=19.2° ASTIGMATIC ABERRATION
FIG.16K ω=19.2° DISTORTION
FIG.16L ω=19.2° LATERAL CHROMATIC ABERRATION

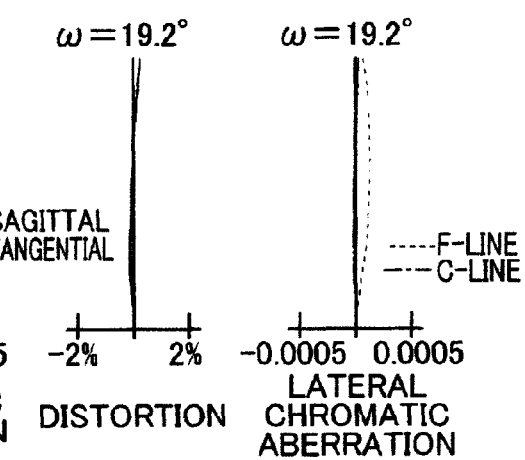

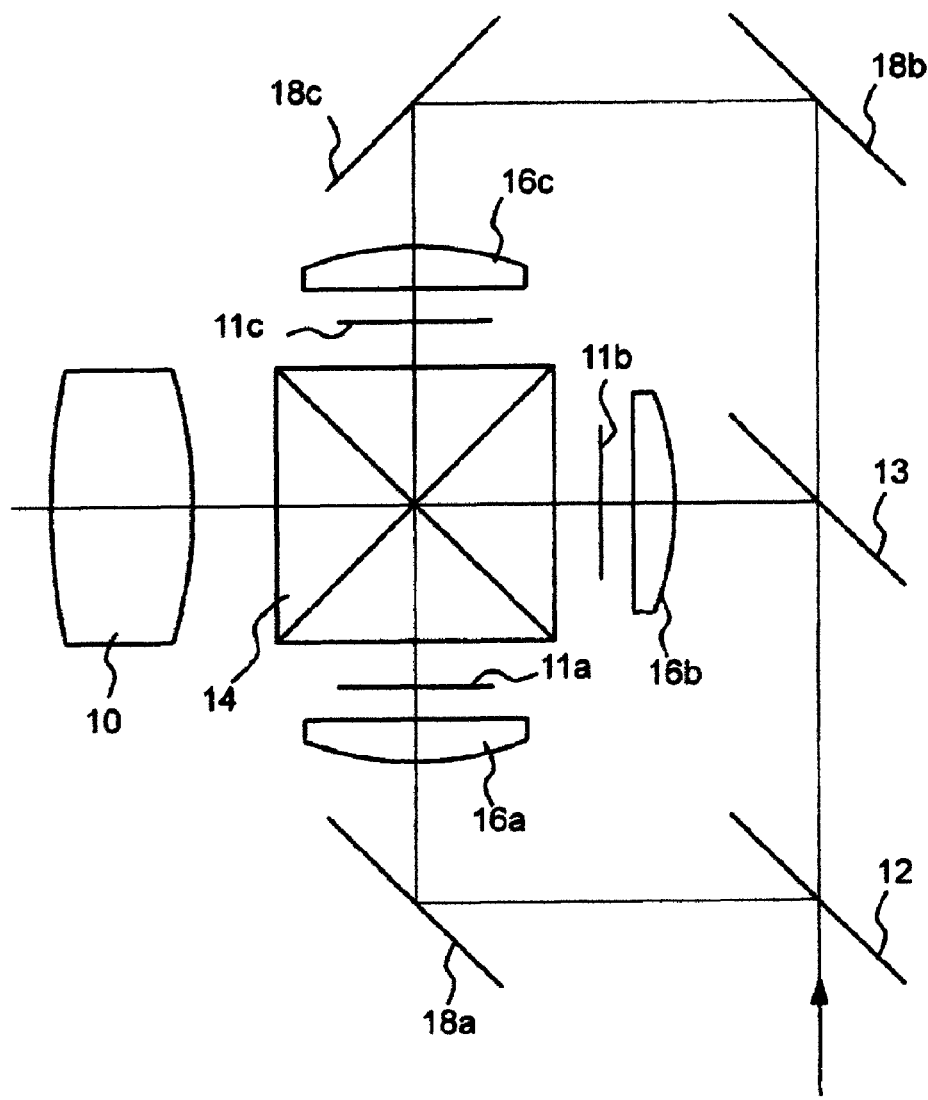
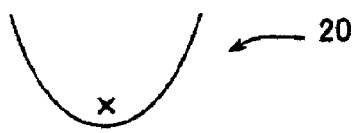
FIG.17

ZOOM LENS FOR PROJECTION AND PROJECTION-TYPE DISPLAY DEVICE

BACKGROUND OF THE INVENTION

1. Field of the Invention

The present invention relates to a zoom lens for projection and a projection-type display device on which the zoom lens for projection is mounted.

2. Description of the Related Art

In recent years, projection-type display devices, such as transmission-type or reflection-type liquid crystal display devices and DMD (digital micromirror device) display devices, which use various kinds of light bulbs and have relatively long back focus, were widely used. Further, the performance of such devices has been becoming higher.

The projection-type display device uses, as a projection lens, a zoom lens, which can change the size of an image formed on a screen, in many cases. Recently, there is an increasing demand for a zoom lens that can greatly change the size of the image, in other words, a zoom lens having a higher zoom ratio.

Further, a lens shift function and a widening function of the zoom lens became required. The lens shift function shifts the center of a projected image with respect to the projection-type display device, for example, to the upper side. The widening function can project a large image at a position close to the projection-type display device. Therefore, zoom lenses having wider angles (wider angles of view) are needed.

Further, an optical system or the like using a plurality of light bulbs needs space for inserting a prism that combines, together, light beams of various colors output from the plurality of light bulbs respectively. Therefore, long back focus is required.

Conventionally, this kind of projection-type zoom lens disclosed, for example, in Japanese Unexamined Patent Publication No. 2007-240731 (Patent Document 1) or Japanese Unexamined Patent Publication No. 2007-304268 (Patent Document 2) was known.

However, with respect to the zoom ratio, the angle of view, and the back focus, neither of the zoom lenses disclosed in Patent Document 1 and Patent Document 2 sufficiently satisfies the need in recent year.

SUMMARY OF THE INVENTION

In view of the foregoing circumstances, it is an object of the present invention to provide a zoom lens for projection that has a wide angle of view and a high zoom ratio, in which a sufficiently long back focus for inserting a prism for combining light beams is maintained. The zoom lens for projection can excellently correct various kinds of aberrations. Further, it is another object of the present invention to provide a projection-type display device on which the zoom lens for projection is mounted.

A first zoom lens for projection according to the present invention is a zoom lens for projection comprising:

a first lens group having a negative refractive power;

a second lens group having a positive refractive power; a third lens group having a positive refractive power;

a fourth lens group having a negative refractive power; a fifth lens group having a positive refractive power; and a sixth lens group having a positive refractive power, which are arranged from a magnification side of the zoom lens, wherein a reduction side of the zoom lens is telecentric, and wherein when the magnification of the zoom lens is changed, the first lens group and the sixth lens group are fixed, and each of the second lens group, the third lens group, the fourth lens group and the fifth lens group moves along the optical axis of the zoom lens, and wherein the fourth lens group is a negative lens having a concave surface facing the magnification side, and wherein the fifth lens group includes at least two positive lenses and at least two negative lenses, and wherein the following formula (1) is satisfied:

$$-5.0 \leq f4/fw \leq -1.2 \tag{1},$$

where f4: the focal length of the fourth lens group; and fw: the focal length of the entire system of the zoom lens at a wide angle end (wide end).

A second zoom lens for projection according to the present invention is a zoom lens for projection, in which the following formula (2) is satisfied in the first zoom lens for projection:

$$2.0 \leq Bf/fw \leq 5.0 \tag{2},$$

where Bf: back focus in air on the reduction side of the entire system of the zoom lens.

A third zoom lens for projection according to the present invention is a zoom lens for projection in which the following formula (3) is satisfied in the first or second zoom lens for projection:

$$1.5 \leq ft/fw \tag{3},$$

where ft: the focal length of the entire system of the zoom lens at a telescopic end (tele end).

A fourth zoom lens for projection according to the present invention is a zoom lens for projection in which the following formula (4) is satisfied in any one of the first to third zoom lenses for projection:

$$55 \leq v5 \tag{4},$$

where v5: an average value of Abbe numbers of the positive lenses included in the fifth lens group.

A fifth zoom lens for projection according to the present invention is a zoom lens for projection in which the fifth lens group includes a negative lens, a positive lens, a negative lens and a positive lens that are arranged from the magnification side in any one of the first to fourth zoom lenses for projection.

A sixth zoom lens for projection according to the present invention is a zoom lens for projection in which the negative lens, the positive lens, the negative lens, and the positive lens in the fifth lens group of the fifth zoom lens for projection form two cemented lenses, each of which is composed of a negative lens and a positive lens.

A seventh zoom lens for projection according to the present invention is a zoom lens for projection, in which the first lens group of any one of the first to sixth zoom lenses for projection includes at least one aspheric surface.

A projection-type display device according to the present invention is a projection-type display device comprising:

a light source;

a light bulb; an illumination optical unit that guides a light beam output from the light source to the light bulb; and any one of the first to seventh zoom lenses for projection, the reduction side of the zoom lens being telecentric, wherein the light beam output from the light source is modulated by the light bulb, and projected onto a screen by the zoom lens for projection.

The term "magnification side" means a projected side (screen side), and even in reduction projection, the screen side is referred to, for convenience, as the magnification side. Meanwhile, the term "reduction side" means an original image display area side (light bulb side), and even in reduction projection, the light bulb side is referred to, for convenience, as the reduction side.

The zoom lens for projection of the present invention, and the projection-type display device using the zoom lens for projection of the present invention can sufficiently satisfy the need in recent years with respect to all of the zoom ratio, the angle of view and the back focus.

Generally, when the zoom ratio is high, the movement amount of each lens group tends to be large. Therefore, the aberration balance of spherical aberration and field curvature at the wide angle end and the telescopic end deteriorates greatly. However, in the zoom lens of the present invention, the fourth lens group, which is a middle group among movable groups, has a negative refractive power. Therefore, the lens group that can greatly correct aberrations is arranged between lens groups the movement amounts of which are large (the magnitude of changing magnification is large). Hence, it is possible to reduce the deterioration of the aberration balance of spherical aberration and field curvature at the wide angle end and the telescopic end.

Further, when the focal length is set so as to satisfy formula (1), it is possible to satisfy the action and effect of the zoom lens in a more excellent manner. It is possible to further reduce the deterioration of the aberration balance of spherical aberration and field curvature at the wide angle end and the telescopic end, while a high zoom ratio is maintained. Further, when the fourth lens group is a simple lens (single lens), it is possible to reduce the cost of the zoom lens.

Further, when the fifth lens group that has a positive refractive power, as a whole, includes at least two positive lenses and at least two negative lenses, the achromatic effect by a combination of a negative lens and a positive lens can be amplified. Further, it is possible to effectively correct the field curvature (field curvature in a sagittal direction) induced by increasing the angle of view.

BRIEF DESCRIPTION OF THE DRAWINGS

FIGS. 9A through 9L are diagrams illustrating aberrations of the zoom lens for projection of Example 1 at the wide angle end (wide), a middle position (middle), the telescopic end (tele);

FIGS. 10A through 10L are diagrams illustrating aberrations of the zoom lens for projection of Example 2 at the wide angle end (wide), a middle position (middle), the telescopic end (tele);

FIGS. 11A through 11L are diagrams illustrating aberrations of the zoom lens for projection of Example 3 at the wide angle end (wide), a middle position (middle), the telescopic end (tele);

FIGS. 12A through 12L are diagrams illustrating aberrations of the zoom lens for projection of Example 4 at the wide angle end (wide), a middle position (middle), the telescopic end (tele);

FIGS. 13A through 13L are diagrams illustrating aberrations of the zoom lens for projection of Example 5 at the wide angle end (wide), a middle position (middle), the telescopic end (tele);

FIGS. 14A through 14L are diagrams illustrating aberrations of the zoom lens for projection of Example 6 at the wide angle end (wide), a middle position (middle), the telescopic end (tele);

FIGS. 15A through 15L are diagrams illustrating aberrations of the zoom lens for projection of Example 7 at the wide angle end (wide), a middle position (middle), the telescopic end (tele);

FIGS. 16A through 16L are diagrams illustrating aberrations of the zoom lens for projection of Example 8 at the wide angle end (wide), a middle position (middle), the telescopic end (tele); and FIG. 17 is a schematic diagram illustrating a part of a projection-type display device according to an embodiment of the present invention.

DESCRIPTION OF THE PREFERRED EMBODIMENTS

Figure 1:
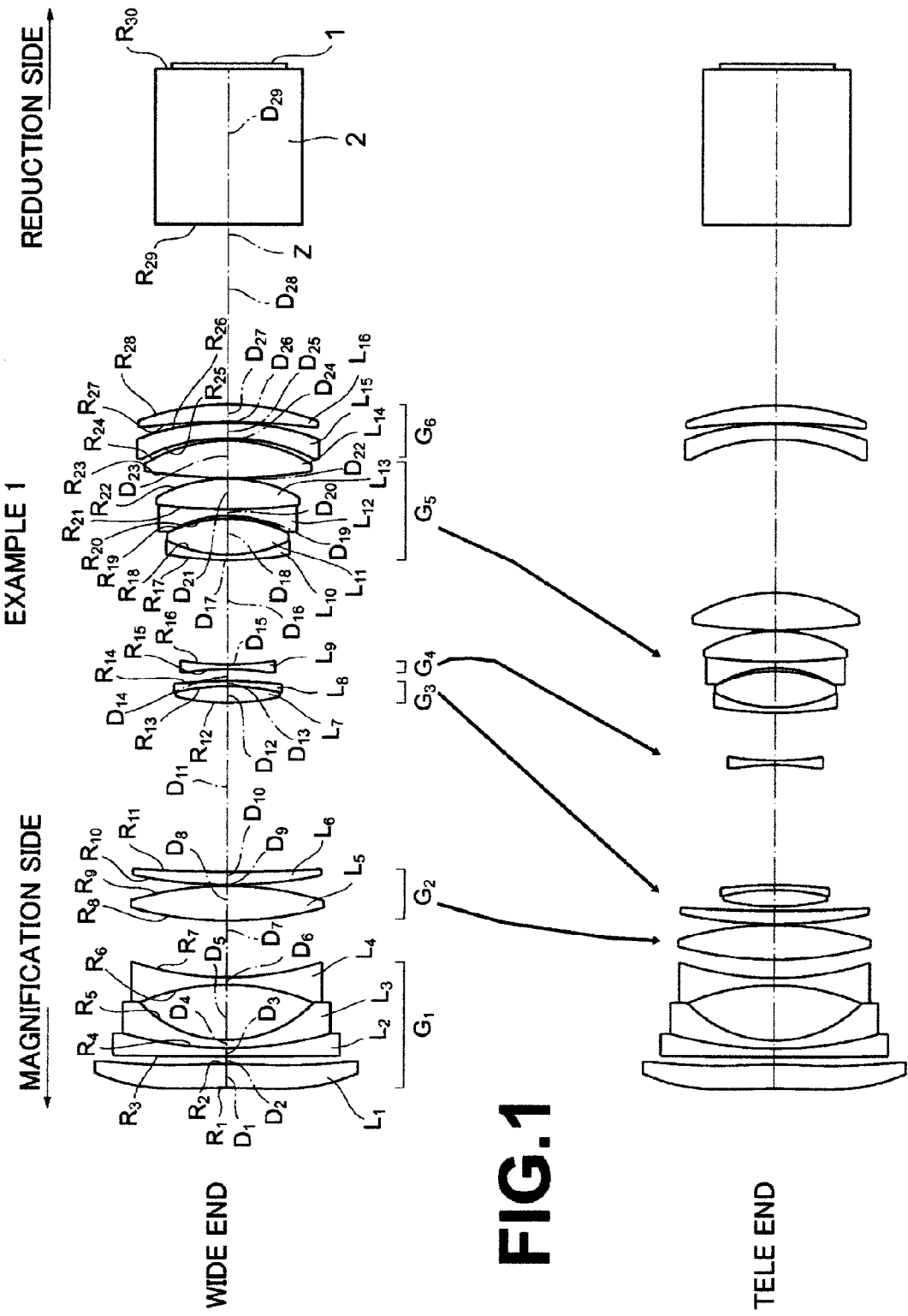
FIG. 1 is a diagram illustrating the structure of lenses in a zoom lens for projection of Example 1, and movement positions of respective lens groups at a wide angle end (wide) and a telescopic end (tele)

Hereinafter, embodiments of the present invention will be described with reference to drawings. FIG. 1 is a diagram illustrating the structure of lenses in a zoom lens according to Example 1 of the present invention at a wide angle end (wide) and at a telescopic end (tele). This zoom lens will be used as a representative example to describe the embodiments of the present invention.

A zoom lens according to the embodiment of the present invention may be used as a zoom lens for projection that is mounted on a projection-type display device. For example, the zoom lens for projection of the present invention includes a first lens group $G_1$, a second lens group $G_2$, a third lens group $G_3$, a fourth lens group $G_4$/a fifth lens group $G_5$, and a sixth lens group $G_6$, which are sequentially arranged from the magnification side. The first lens group $G_1$ performs focusing in a fixed state when the magnification is changed, and has a negative refractive power. The second lens group $G_2$ moves along optical axis Z of the zoom lens when the magnification is changed, and has a positive refractive power. The third lens group $G_3$ moves along the optical axis Z of the zoom lens when the magnification is changed, and has a positive refractive power. The fourth lens group $G_4$ moves along the optical axis Z of the zoom lens when the magnification is changed, and a negative refractive power. The fifth lens group $G_5$ moves along the optical axis Z of the zoom lens when the magnification is changed, and has a positive refractive power. The sixth lens group $G_6$ is fixed when the magnification is changed, and has a positive refractive power.

Each of the second lens group $G_2$, the third lens group $G_3$, the fourth lens group $G_4$, and the fifth lens group $G_5$ moves from the reduction side of the zoom lens to the magnification of the zoom lens when the magnification is changed from the wide angle end to the telescopic end. The lens groups may move to the magnification side, after moving to the reduction side first (in each example, the fourth lens group $G_4$ is set to move to the magnification, after moving to the reduction side).

Further, the reduction side is formed to be substantially telecentric (telecentric system).

The fourth lens group $G_4$ is a negative simple lens having a concave surface facing the magnification side. Further, the fifth lens group $G_5$ includes at least two positive lenses and at least two negative lenses.

For example, the first lens group $G_1$ is composed of four lenses $L_1$ through $L_4$ (three lenses in Example 8). The second lens group $G_2$ is composed of two lenses $L_5$ and $L_6$ (one lens in Example 8). The third lens group $G_3$ is composed of two lenses $L_7$ and $L_8$ and the fourth lens group $G_4$ is a single lens $L_9$. The fifth lens group $G_5$ is composed of five lenses $L_{10}$ through $L_{14}$ (six lenses in Examples 2, 3, and 5). The sixth lens group $G_6$ is composed of two lenses $L_{15}$ and $L_{16}$ (one lens in Examples 5 through 8).

Further, focusing is performed, for example, by moving the whole first lens group $G_1$ in the direction of optical axis z of the zoom lens.

The sixth lens group $G_6$ is a relay lens that is fixed when the magnification is changed. Further, a color combining prism 2 (including various kinds of filter, such as a low-pass filter, hereinafter the same) is arranged between the sixth lens group $G_6$ and an image display plane 1 as the light bulb.

Further, it is desirable that the zoom lens for projection of the embodiment of the present invention satisfies the following formula (1):

$$-5.0 \leq f4/fw \leq -1.2 \qquad (1),$$

where f4: the focal length of the fourth lens group $G_4$; and fw: the focal length of the entire system of the zoom lens at a wide angle end.

The formula (1) defines the power of the fourth lens group $G_4$. The formula (1) represents a condition for suppressing deterioration in the balance of spherical aberration and field curvature (variation in aberration) at the wide angle end and the telescopic end.

When the value of f4/fw exceeds the upper limit represented by the formula (1), the negative refractive power of the fourth lens group $G_4$ is too strong, and rays on the optical axis are refracted excessively. Therefore, it becomes difficult to suppress the deterioration in the balance of aberration. Further, it becomes difficult even to correct the spherical aberration. When the value of f4/fw is lower than the lower limit represented by the formula (1), the negative refractive power of the fourth lens group G4 is too weak. Therefore, it becomes difficult to achieve a great advantageous effect to prevent the deterioration in the balance of aberration. Further, it becomes difficult to maintain a back focus that is necessary to insert a color combining prism or the like.

Therefore, it is more desirable that the following formula (1') is satisfied, instead of the formula (1):

$$-4.0 \leq f4/fw \leq -1.5 \qquad (1').$$

Further, it is even more desirable that the following formula (1") is satisfied, instead of the formula (1'):

$$-3.0 \leq f4/fw \leq -1.7 \qquad (1'').$$

It is desirable that the zoom lens for projection according to the embodiment of the present invention satisfies the following formula (2):

$$2.0 \leq Bf/fw \leq 5.0 \qquad (2),$$

where Bf: back focus in air on the reduction side of the entire system of the zoom lens; and fw: the focal length of the entire system of the zoom lens at a wide angle end.

The formula (2) defines the back focus.

Specifically, it is not desirable that the value of Bf/fw exceeds the upper limit defined by the formula (2), because the size of the lens system becomes large. In contrast, when the value of Bf/fw is lower than the lower limit defined by the formula (2), it becomes difficult to insert a color combining unit, such as a color combining prism, between the zoom lens and the light bulb.

Therefore, it is more desirable that the following formula (2') is satisfied, instead of the formula (2):

$$2.5 \leq Bf/fw \leq 4.0 \qquad (2').$$

Further, it is even more desirable that the following formula (2") is satisfied, instead of the formula (2'):

$$2.7 \leq Bf/fw \leq 3.7 \qquad (2'').$$

It is desirable that the zoom lens for projection according to the embodiment of the present invention satisfies the following formula (3):

$$1.5 \leq ft/fw \qquad (3),$$

where ft: the focal length of the entire system of the zoom lens at a telescopic end; and fw: the focal length of the entire system of the zoom lens at a wide angle end.

The formula (3) defines a zoom ratio, which is the ratio of the focal length at the telescopic end to the focal length at the wide angle end. When the value of ft/fw becomes lower than the lower limit, it becomes difficult to improve the installation characteristic of the device.

It is desirable that the zoom lens for projection according to the embodiment of the present invention satisfies the following formula (4):

$$55 \leq v5 \qquad (4),$$

where v5: an average value of Abbe numbers of the positive lenses included in the fifth lens group $G_5$.

The formula (4) defines the average value of Abbe numbers of the positive lenses included in the fifth lens group $G_5$. If the value of v5 becomes lower than the lower limit defined by the formula (4), the lateral chromatic aberration becomes too large. Hence, it becomes difficult to correct various kinds of aberration.

Therefore, it is more desirable that the following formula (4') is satisfied, instead of the formula (4):

$$65 \leq v5 \qquad (4').$$

Further, it is even more desirable that the following formula (4") is satisfied, instead of the formula (4'):

$$70 \leq v5 \qquad (4'').$$

It is desirable that the fifth lens group $G_5$ includes a negative lens, a positive lens, a negative lens and a positive lens that are arranged from the magnification side. When the fifth lens group $G_5$ having a positive refractive power as a whole includes at least two positive lenses and at least two negative lenses, it is possible to amplify the achromatic effect by the combination of a negative lens and a positive lens. Further, it is possible to effectively correct the field curvature (field curvature in a sagittal direction) induced by increasing the angle of view.

Further, it is desirable that the negative lens, the positive lens, the negative lens, and the positive lens in the fifth lens group $G_5$ form two cemented lenses, each of which is composed of a negative lens and a positive lens. When the two cemented lenses (negative-positive cemented lenses), each of which is composed of a negative lens and a positive lens, are arranged as described above, it is possible to further amplify the achromatic effect and the correction effect of the field curvature.

It is desirable that the first lens group $G_1$ includes at least one aspheric surface. Accordingly, the aspheric surface is arranged in the lens group that is farthest to the magnification side (in other words, closest to the magnification-side end of the zoom lens), at which the diameter of the light beam is large. Therefore, it is possible to efficiently reduce various kinds of aberration.

Next, a projection-type display device according to an embodiment of the present invention will be described briefly. FIG. 17 is a schematic diagram illustrating the configuration of the projection-type display device according to the embodiment of the present invention.

The projection-type display device illustrated in FIG. 17 includes transmission-type liquid crystal panels 11*a* through 11*c*, as light bulbs. Further, the projection-type display device uses, as a lens 10 for projection, the zoom lens for projection according to the aforementioned embodiment of the present invention. Further, an integrator (not illustrated), such as a fly eye lens or lens array, is arranged between a light source 20 and a dichroic mirror 12. White light output from the light source 20 enters the liquid crystal panels 11*a* through 11*c*, which correspond to light beams of three colors (G light, B light and R light) respectively, through an illumination optical unit, and is modulated. Further, the modulated light is combined by a cross dichroic prism 14, and projected onto a screen (not illustrated) by the lens 10 for projection. The projection-type display device includes dichroic mirrors 12 and 13 for separating light, the dichroic prism 14 for combining colors, condenser lenses 16*a* through 16*c*, and total reflection mirrors 18*a* through 18*c*. The projection-type display device uses the zoom lens 10 for projection according to the embodiment of the present invention. Therefore, the projection-type display device is compact, and a wide angle of view is achieved. Further, the projection-type display device can project images that are light (bright) and that have good image quality.

The projection-type display device illustrated in FIG. 17 is an embodiment of the present invention, and various modifications are possible. For example, a reflection-type liquid crystal panel or a DMD may be used as the light bulb, instead of the transmission-type liquid crystal panel.

EXAMPLES

The zoom lens for projection according to the present invention will be further described by using specific examples. In the following descriptions, each numerical data set, such as R and D, is normalized so that the focal length at the wide angle end is 1.

Example 1

FIG. 1 is a diagram illustrating movement positions and movement paths of respective lens groups at a wide angle end (wide) and a telescopic end (tele) in a zoom lens for projection of Example 1.

In the zoom lens for projection of Example 1, first lens group $G_1$ is composed of first lens $L_1$, second lens $L_2$, third lens $L_3$, and fourth lens $L_4$, which are arranged sequentially from the magnification side of the zoom lens for projection. The first lens $L_1$ is a double-aspheric lens (aspheric-aspheric lens), both surfaces of which are aspheric, and has a weak power. The second lens $L_2$ is a negative meniscus lens having a concave surface facing the reduction side. The third lens $L_3$ is a negative meniscus lens having a concave surface facing the reduction side. The fourth lens $L_4$ is a double-concave lens, both surfaces of which are concave. Further, the second lens $L_2$ and the third lens $L_3$ are cemented together to form a cemented lens.

Second lens group $G_2$ is composed of fifth lens $L_5$, and sixth lens $L_6$, which are arranged sequentially from the magnification side. The fifth lens $L_5$ is a double-convex lens (convex-convex lens). The sixth lens $L_6$ is a positive meniscus lens having a convex surface facing the magnification side.

Third lens group $G_3$ is composed of seventh lens $L_7$, and eighth lens $L_8$, which are arranged sequentially from the magnification side. The seventh lens $L_7$ is a double-convex lens. The eighth lens $L_8$ is a negative meniscus lens having a convex surface facing the reduction side. The seventh lens $L_7$ and the eighth lens $L_8$ are cemented together to form a cemented lens.

Fourth lens group $G_4$ includes only ninth lens $L_9$, which is a double-concave lens. Fifth lens group $G_5$ is composed of tenth lens $L_{10}$, eleventh lens $L_{11}$, twelfth lens $L_{12}$, thirteenth lens $L_{13}$, and fourteenth lens $L_{14}$, which are arranged sequentially from the magnification side. The tenth lens $L_{10}$ is a negative meniscus lens having a convex surface facing the magnification side. The eleventh lens $L_{11}$ is a double-convex lens, and the twelfth lens $L_{12}$ is a double-concave lens. The thirteenth lens $L_{13}$ is a double-convex lens, and the fourteenth lens $L_{14}$ is a double-convex lens. The tenth lens $L_{10}$ and the eleventh lens $L_{11}$ are cemented together to form a cemented lens. Further, the twelfth lens $L_{12}$ and the thirteenth lens $L_{13}$ are cemented together to form a cemented lens.

Sixth lens group $G_6$ is composed of fifteenth lens $L_{15}$ and sixteenth lens $L_{16}$, which are arranged sequentially from the magnification side. The fifteenth lens $L_{15}$ is a double-aspheric lens that forms a negative meniscus lens having a convex surface facing the reduction side. The sixteenth lens $L_{16}$ is a positive meniscus lens having a convex surface facing the reduction side.

The aspheric surface of each of the first lens $L_1$ and the fifteenth lens $L_{15}$ is defined by the following equation (1):

$$Z = \frac{Y^2/R}{1 + \sqrt{1 - K \times Y^2/R^2}} + \sum_{i=3}^{12} A_i Y^i, \qquad \text{[Equation 1]}$$

where

Z: the length of a perpendicular line from a point on an aspheric surface at distance Y from the optical axis to a tangent plane (plane perpendicular to the optical axis) on the vertex of the aspheric surface; Y: a distance from the optical axis;

R: a curvature radius of the aspheric surface in the vicinity of the optical axis;

K: eccentricity; and $A_i$: aspheric coefficient (i=3 through 12).

As illustrated in FIG. 1, when the magnification is changed, the first lens group $G_1$ and the sixth lens group $G_6$ are fixed groups, and the second lens group $G_2$ through the fifth lens group $G_5$ are movable groups.

Further, the reduction side is substantially telecentric.

Table 1 shows values of curvature radius R of each lens surface of the zoom lens for projection, center thickness of each lens and air gap (interval) between lenses (hereinafter, referred to as an "axial surface interval" (interval of surfaces on the optical axis) in general) D, and refractive index N and Abbe number ν of each lens for d-line. The numbers on the left side of Table 1 represent the order of each surface from the magnification side (same for Tables 3, 5, 7, 9, 11, 13 and 15).

The lower section of Table 1 shows intervals between lens groups at a wide angle end (wide), a middle position (middle), and a telescopic end (tele) (when the zoom lens is focused on infinity: same for Tables 3, 5, 7, 9, 11, 13 and 15). Further, Table 2 shows aspheric coefficients representing respective aspheric surfaces.

TABLE 1

FOCAL LENGTH F = 1.00~1.54~2.10

| | R | D | Nd | νd |
|---|---|---|---|---|
| 1* | −6.749 | 0.258 | 1.4910 | 57.6 |
| 2* | −6.806 | 0.082 | | |
| 3 | 65.413 | 0.094 | 1.8081 | 22.8 |
| 4 | 4.003 | 0.089 | 1.5891 | 61.1 |
| 5 | 1.301 | 0.601 | | |
| 6 | −2.381 | 0.078 | 1.4970 | 81.5 |
| 7 | 3.184 | (MOVEMENT 1) | | |
| 8 | 4.004 | 0.376 | 1.5955 | 39.2 |
| 9 | −3.447 | 0.010 | | |
| 10 | 4.973 | 0.141 | 1.8052 | 25.4 |
| 11 | 16.741 | (MOVEMENT 2) | | |

TABLE 1-continued

FOCAL LENGTH F = 1.00~1.54~2.10

| | R | D | Nd | νd |
|---|---|---|---|---|
| 12 | 2.445 | 0.182 | 1.6034 | 38.0 |
| 13 | −2.445 | 0.054 | 1.8052 | 25.4 |
| 14 | −5.262 | (MOVEMENT 3) | | |
| 15 | −2.784 | 0.049 | 1.6968 | 55.5 |
| 16 | 3.236 | (MOVEMENT 4) | | |
| 17 | 3.974 | 0.056 | 1.8340 | 37.2 |
| 18 | 1.460 | 0.394 | 1.4970 | 81.5 |
| 19 | −1.460 | 0.035 | | |
| 20 | −1.204 | 0.066 | 1.8340 | 37.2 |
| 21 | 5.914 | 0.335 | 1.4970 | 81.5 |
| 22 | −1.560 | 0.009 | | |
| 23 | 6.004 | 0.404 | 1.4970 | 81.5 |
| 24 | −1.720 | (MOVEMENT 5) | | |
| 25* | −2.471 | 0.164 | 1.4910 | 57.6 |
| 26* | −3.587 | 0.014 | | |
| 27 | −7.109 | 0.191 | 1.8052 | 25.4 |
| 28 | −2.681 | 1.960 | | |
| 29 | ∞ | 1.690 | 1.5163 | 64.1 |
| 30 | ∞ | | | |

| MOVEMENT INTERVAL | WIDE END | MIDDLE POSITION | TELE END |
|---|---|---|---|
| MOVEMENT 1 | 0.618 | 0.287 | 0.206 |
| MOVEMENT 2 | 1.838 | 1.164 | 0.044 |
| MOVEMENT 3 | 0.129 | 0.905 | 1.306 |
| MOVEMENT 4 | 1.135 | 0.587 | 0.518 |
| MOVEMENT 5 | 0.024 | 0.802 | 1.670 |

*IS ASPHERIC

TABLE 2

ASPHERIC COEFFICIENT

| SURFACE NUMBER | K | $A_3$ | $A_4$ | $A_5$ | $A_6$ |
|---|---|---|---|---|---|
| 1 | 19.40949 | −2.16048E−02 | 2.62828E−01 | −1.48178E−01 | −2.97724E−02 |
| | | $A_7$ | $A_8$ | $A_9$ | $A_{10}$ | $A_{11}$ |
| | | 6.43213E−02 | −4.81675E−03 | −1.77156E−02 | −1.00295E−03 | 9.88286E−03 |
| | | $A_{12}$ | | | | |
| | | −3.30187E−03 | | | | |
| | K | $A_3$ | $A_4$ | $A_5$ | $A_6$ |
| 2 | −8.99554 | −1.76603E−02 | 2.26236E−01 | −1.53432E−01 | −2.79709E−03 |
| | | $A_7$ | $A_8$ | $A_9$ | $A_{10}$ | $A_{11}$ |
| | | 1.35884E−02 | 6.64252E−03 | −7.41642E−04 | −1.32997E−03 | 2.23125E−03 |
| | | $A_{12}$ | | | | |
| | | −1.61665E−03 | | | | |
| | K | $A_3$ | $A_4$ | $A_5$ | $A_6$ |
| 25 | 1.00000 | 0.00000E+00 | −6.42221E−02 | −9.47620E−02 | 1.06517E−01 |
| | | $A_7$ | $A_8$ | $A_9$ | $A_{10}$ |
| | | 5.79861E−02 | −4.48647E−02 | −5.00536E−02 | 3.45129E−02 |
| | K | $A_3$ | $A_4$ | $A_5$ | $A_6$ |
| 26 | 1.00000 | 0.00000E+00 | −5.16120E−02 | −7.14236E−02 | 7.87214E−02 |
| | | $A_7$ | $A_8$ | $A_9$ | $A_{10}$ |
| | | 5.49187E−02 | −2.30056E−02 | −6.17501E−02 | 3.54761E−02 |

According to the zoom lens for projection of Example 1, all of the formulas (1) through (4), (1'), (1"), (2'), (2"), (4') and (4") are satisfied, as Table 17 shows.

FIGS. 9A through 9L are diagrams illustrating aberrations of the zoom lens for projection of Example 1 at the wide angle end (wide), a middle position (middle), the telescopic end (tele). FIGS. 9A through 9L illustrate spherical aberrations, astigmatic aberrations, distortions and lateral chromatic aberrations. In FIGS. 9B, 9F and 9J, which illustrate astigmatic aberrations, astigmatic aberrations with respect to sagittal image planes and astigmatic aberrations with respect to tangential image planes are illustrated (same for FIGS. 10B, 10F and 10J through FIGS. 16B, 16F and 16J).

As these diagrams illustrating aberrations clearly show, the zoom lens for projection of Example 1 can remarkably reduce a variation in various kinds of aberrations, such as spherical aberration and astigmatic aberration, caused by zooming. Further, it is possible to correct the aberrations in an extremely efficient manner.

Example 2

Figure 2:
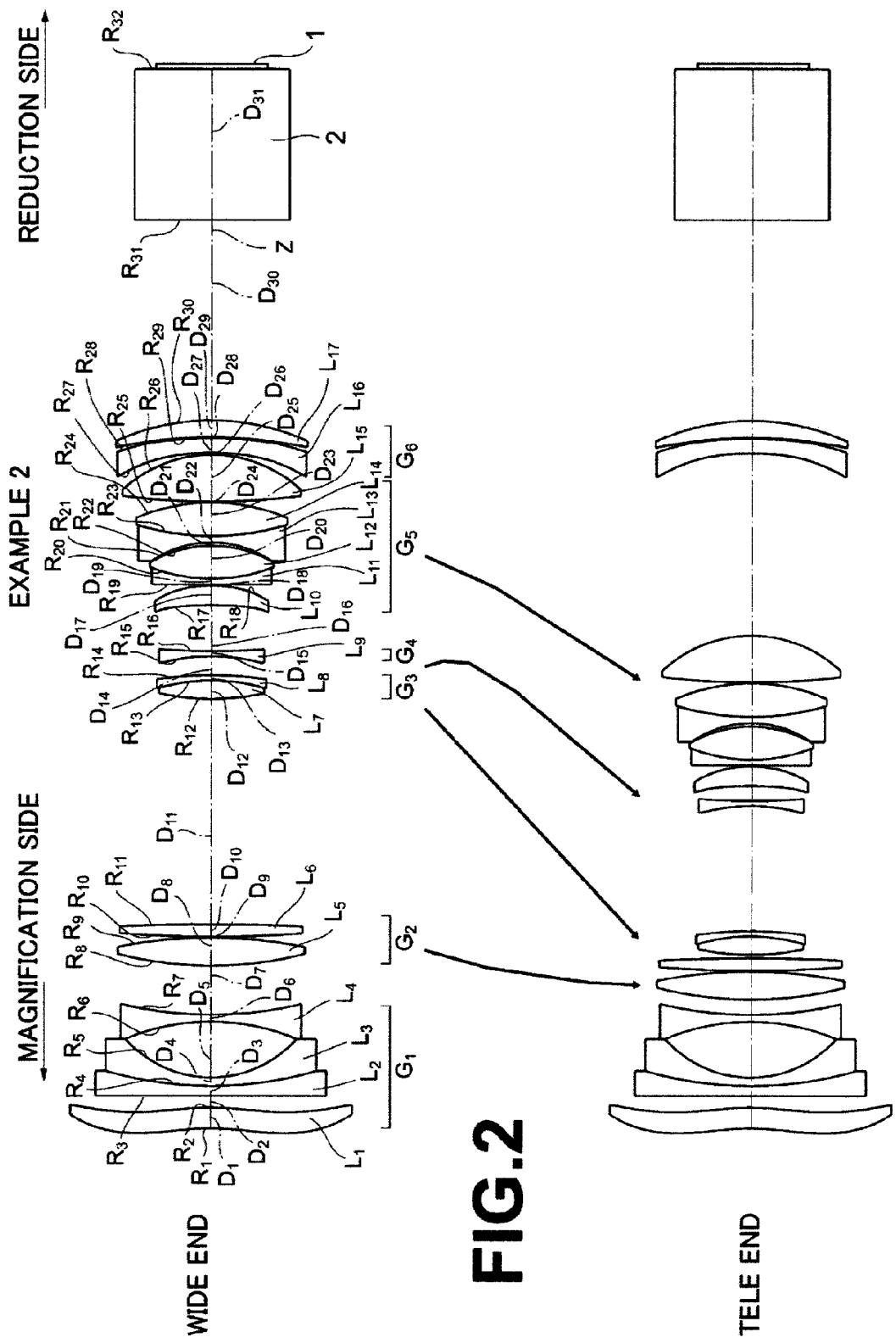
FIG. 2 is a diagram illustrating the structure of lenses in a zoom lens for projection of Example 2, and movement positions of respective lens groups at a wide angle end (wide) and a telescopic end (tele)

FIG. 2 is a diagram illustrating movement positions and movement paths of respective lens groups at a wide angle end (wide) and a telescopic end (tele) in a zoom lens for projection of Example 2.

The zoom lens for projection of Example 2 includes six lens groups in a manner basically similar to the zoom lens for projection of Example 1. However, the zoom lens for projection of Example 2 differs from the zoom lens for projection of Example 1 in that the second lens $L_2$ in the first lens group $G_1$ is a plano-concave lens, which has a flat surface and a concave surface, and that the sixth lens $L_6$ in the second lens group $G_2$ is a double-convex lens. Further, in the zoom lens for projection of Example 2, the fifth lens group $G_5$ is composed of the tenth lens $L_{10}$, eleventh lens $L_{11}$, twelfth lens $L_{12}$, thirteenth lens $L_{13}$, fourteenth lens $L_{14}$, and fifteenth lens $L_{15}$, which are arranged sequentially from the magnification side, and the tenth lens $L_{10}$ is a double-aspheric lens in positive meniscus lens form having a convex surface facing the reduction side. Further, the eleventh lens $L_{11}$ is a negative meniscus lens having a convex surface facing the magnification side, and the twelfth lens $L_{12}$ is a double-convex lens. The thirteenth lens $L_{13}$ is a double-concave lens, and the fourteenth lens $L_{14}$ is a double-convex lens. The fifteenth lens $L_{15}$ is a double-convex lens. Further, the eleventh lens $L_{11}$ and the twelfth lens $L_{12}$ are cemented together to form a cemented lens. Further, the thirteenth lens $L_{13}$ and the fourteenth lens $L_{14}$ are cemented together to form a cemented lens.

As illustrated in FIG. 2, in a manner substantially similar to Example 1, when the magnification is changed, the first lens group $G_1$ and the sixth lens group $G_6$ are fixed groups, and the second lens group $G_2$ through the fifth lens group $G_5$ are movable groups.

Further, the reduction side is substantially telecentric.

Table 3 shows values of curvature radius R of each lens surface of the zoom lens for projection, axial surface interval D for each lens, and refractive index N and Abbe number v of each lens for d-line.

The lower section of Table 3 shows intervals between lens groups at a wide angle end (wide), a middle position (middle), and a telescopic end (tele). Further, Table 4 shows aspheric coefficients representing respective aspheric surfaces.

TABLE 3

| FOCAL LENGTH F = 1.00~1.60~2.30 | | | |
|---|---|---|---|
| R | D | Nd | vd |
| 1* −2.414 | 0.239 | 1.4910 | 57.6 |
| 2* −2.640 | 0.132 | | |
| 3 ∞ | 0.114 | 1.8081 | 22.8 |
| 4 4.230 | 0.096 | 1.6180 | 63.3 |
| 5 1.294 | 0.637 | | |
| 6 −2.468 | 0.081 | 1.4970 | 81.5 |
| 7 4.357 | (MOVEMENT 1) | | |
| 8 4.284 | 0.319 | 1.6990 | 30.1 |
| 9 −5.456 | 0.010 | | |
| 10 13.163 | 0.142 | 1.7552 | 27.5 |
| 11 −20.697 | (MOVEMENT 2) | | |
| 12 2.841 | 0.209 | 1.6129 | 37.0 |
| 13 −2.147 | 0.060 | 1.8052 | 25.4 |
| 14 −4.290 | (MOVEMENT 3) | | |
| 15 −2.121 | 0.055 | 1.8040 | 46.6 |
| 16 7.367 | (MOVEMENT 4) | | |
| 17* −5.251 | 0.224 | 1.5686 | 58.6 |
| 18* −1.405 | 0.010 | | |
| 19 122.071 | 0.064 | 1.8040 | 46.6 |
| 20 1.883 | 0.378 | 1.4970 | 81.5 |
| 21 −1.403 | 0.038 | | |
| 22 −1.203 | 0.072 | 1.8061 | 40.9 |
| 23 2.924 | 0.383 | 1.4970 | 81.5 |
| 24 −2.159 | 0.010 | | |
| 25 8.147 | 0.534 | 1.4970 | 81.5 |
| 26 −1.477 | (MOVEMENT 5) | | |
| 27* −3.220 | 0.168 | 1.4910 | 57.6 |
| 28* −6.450 | 0.010 | | |
| 29 −5.190 | 0.193 | 1.8052 | 25.4 |
| 30 −2.631 | 2.276 | | |
| 31 ∞ | 1.717 | 1.5163 | 64.1 |
| 32 ∞ | | | |
| MOVEMENT INTERVAL | WIDE END | MIDDLE POSITION | TELE END |
| MOVEMENT 1 | 0.556 | 0.206 | 0.177 |
| MOVEMENT 2 | 2.564 | 1.477 | 0.037 |
| MOVEMENT 3 | 0.216 | 1.077 | 1.426 |
| MOVEMENT 4 | 0.525 | 0.187 | 0.168 |
| MOVEMENT 5 | 0.021 | 0.934 | 2.074 |

*IS ASPHERIC

TABLE 4

| ASPHERIC COEFFICIENT | | | | |
|---|---|---|---|---|
| SURFACE NUMBER | K | $A_3$ | $A_4$ | $A_5$ | $A_6$ |
| 1 | 1.82590 | −9.57258E−03 | 3.83470E−01 | −2.32984E−01 | −2.22317E−03 |
| | $A_7$ | $A_8$ | $A_9$ | $A_{10}$ | $A_{11}$ |
| | 4.50008E−02 | 4.14162E−03 | −8.72077E−03 | −2.53071E−03 | 2.68364E−03 |

TABLE 4-continued

ASPHERIC COEFFICIENT

| | $A_{12}$ | | | |
|---|---|---|---|---|
| | −2.82519E−04 | | | |

| | K | $A_3$ | $A_4$ | $A_5$ | $A_6$ |
|---|---|---|---|---|---|
| 2 | −1.24103 | −3.40605E−03 | 3.13404E−01 | −1.92720E−01 | −8.79290E−03 |

| | $A_7$ | $A_8$ | $A_9$ | $A_{10}$ | $A_{11}$ |
|---|---|---|---|---|---|
| | 1.76288E−02 | 8.90924E−03 | 5.27592E−04 | −2.32150E−03 | −8.85631E−04 |

| | $A_{12}$ |
|---|---|
| | 4.16303E−04 |

| | K | $A_4$ | $A_6$ | $A_8$ | $A_{10}$ |
|---|---|---|---|---|---|
| 17 | 1.00000 | −1.35166E−01 | −1.26873E−01 | −1.67517E−01 | 1.79226E−01 |

| | K | $A_4$ | $A_6$ | $A_8$ | $A_{10}$ |
|---|---|---|---|---|---|
| 18 | 1.00000 | −7.30848E−02 | −6.97596E−02 | −1.99401E−01 | 1.48971E−01 |

| | K | $A_3$ | $A_4$ | $A_5$ | $A_6$ |
|---|---|---|---|---|---|
| 27 | 1.00000 | 0.00000E+00 | −1.09369E−01 | 3.38263E−04 | 4.84136E−02 |

| | $A_7$ | $A_8$ | $A_9$ | $A_{10}$ |
|---|---|---|---|---|
| | −1.04148E−02 | −5.35689E−03 | 1.09867E−02 | −7.14610E−03 |

| | K | $A_3$ | $A_4$ | $A_5$ | $A_6$ |
|---|---|---|---|---|---|
| 28 | 1.00000 | 0.00000E+00 | −9.54722E−02 | 1.32362E−02 | 2.68614E−02 |

| | $A_7$ | $A_8$ | $A_9$ | $A_{10}$ |
|---|---|---|---|---|
| | 9.50946E−03 | −4.36643E−03 | −7.39309E−03 | 2.55718E−03 |

According to the zoom lens for projection of Example 2, all of the formulas (1) through (4), (1'), (1"), (2'), (2"), (4') and (4") are satisfied, as Table 17 shows.

FIGS. 10A through 10L are diagrams illustrating aberrations of the zoom lens for projection of Example 2 at the wide angle end (wide), a middle position (middle), the telescopic end (tele). FIGS. 10A through 10L illustrate spherical aberrations, astigmatic aberrations, distortions and lateral chromatic aberrations.

As these diagrams illustrating aberration clearly show, the zoom lens for projection of Example 2 can remarkably reduce a variation in various kinds of aberrations, such as spherical aberration and astigmatic aberration, caused by zooming. Further, it is possible to correct the aberrations in an extremely efficient manner.

Example 3

Figure 3:
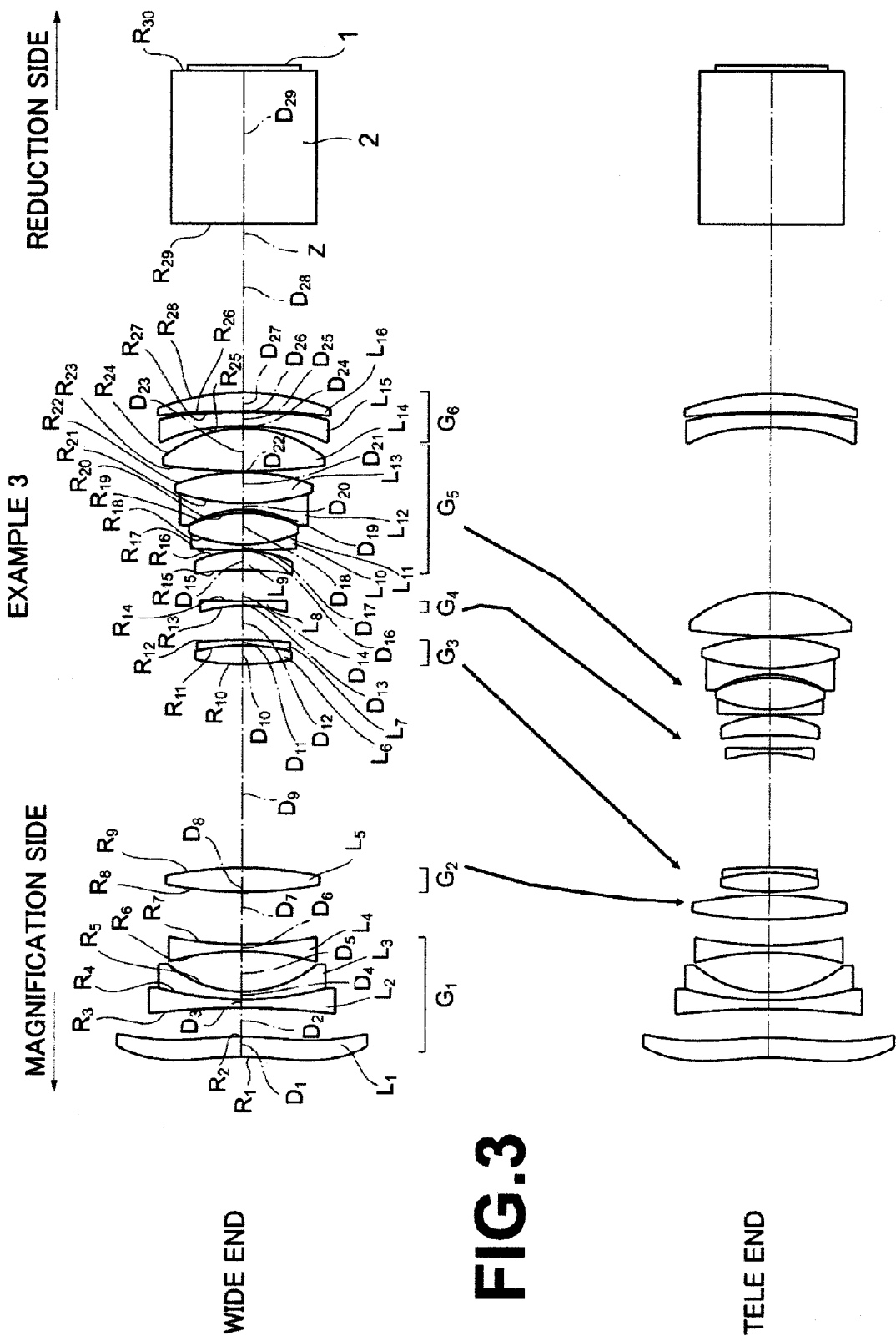
FIG. 3 is a diagram illustrating the structure of lenses in a zoom lens for projection of Example 3, and movement positions of respective lens groups at a wide angle end (wide) and a telescopic end (tele)

FIG. 3 is a diagram illustrating movement positions and movement paths of respective lens groups at a wide angle end (wide) and a telescopic end (tele) in a zoom lens for projection of Example 3.

The zoom lens for projection of Example 3 includes six lens groups in a manner basically similar to the zoom lens for projection of Example 1. However, the zoom lens for projection of Example 3 differs from the zoom lens for projection of Example 1 in that the second lens $L_2$ in the first lens group $G_1$ is a double-concave lens, and that the second lens group $G_2$ includes only the fifth lens $L_5$, which is a double-convex lens. Further, in the zoom lens for projection of Example 3, the fifth lens group $G_5$ is composed of the ninth lens $L_9$, tenth lens $L_{10}$, eleventh lens $L_{11}$, twelfth lens $L_{12}$, thirteenth lens $L_{13}$, and fourteenth lens $L_{14}$, which are arranged sequentially from the magnification side. The ninth lens $L_9$ is a double-aspheric lens in positive meniscus form having a convex surface facing the reduction side, and the tenth lens $L_{10}$ is a negative meniscus lens having a convex surface facing the magnification side. Further, the eleventh lens $L_{11}$ is a double-convex lens, and the twelfth lens $L_{12}$ is a double-concave lens. The thirteenth lens $L_{13}$ is a double-convex lens, and the fourteenth lens $L_{14}$ is a double-convex lens. Further, the tenth lens $L_{10}$ and the eleventh lens $L_{11}$ are cemented together to form a cemented lens. Further, the twelfth lens $L_{12}$ and the thirteenth lens $L_{13}$ are cemented together to form a cemented lens.

As illustrated in FIG. 3, in a manner substantially similar to Example 1, when the magnification is changed, the first lens group $G_1$ and the sixth lens group $G_6$ are fixed groups, and the second lens group $G_2$ through the fifth lens group $G_5$ are movable groups.

Further, the reduction side is substantially telecentric.

Table 5 shows values of curvature radius R of each lens surface of the zoom lens for projection, axial surface interval D for each lens, and refractive index N and Abbe number ν of each lens for d-line.

The lower section of Table 5 shows intervals between lens groups at a wide angle end (wide), a middle position (middle), and a telescopic end (tele). Further, Table 6 shows aspheric coefficients representing respective aspheric surfaces.

TABLE 5

FOCAL LENGTH F = 1.00~1.54~2.10

| | R | D | Nd | vd |
|---|---|---|---|---|
| 1* | −2.906 | 0.224 | 1.4910 | 57.6 |
| 2* | −3.029 | 0.319 | | |
| 3 | −8.748 | 0.094 | 1.8081 | 22.8 |
| 4 | 3.432 | 0.088 | 1.5163 | 64.1 |
| 5 | 1.280 | 0.444 | | |
| 6 | −2.967 | 0.078 | 1.4970 | 81.5 |
| 7 | 4.062 | (MOVEMENT 1) | | |
| 8 | 4.475 | 0.265 | 1.8052 | 25.4 |
| 9 | −4.109 | (MOVEMENT 2) | | |
| 10 | 2.702 | 0.212 | 1.6477 | 33.8 |
| 11 | −2.166 | 0.058 | 1.8052 | 25.4 |
| 12 | −4.573 | (MOVEMENT 3) | | |
| 13 | −1.657 | 0.052 | 1.7725 | 49.6 |
| 14 | 19.873 | (MOVEMENT 4) | | |
| 15* | −4.013 | 0.217 | 1.5686 | 58.6 |
| 16* | −1.271 | 0.009 | | |
| 17 | 14.624 | 0.059 | 1.8061 | 33.3 |
| 18 | 1.529 | 0.350 | 1.4970 | 81.5 |
| 19 | −1.381 | 0.038 | | |
| 20 | −1.139 | 0.070 | 1.8061 | 40.9 |
| 21 | 2.434 | 0.344 | 1.4970 | 81.5 |
| 22 | −2.202 | 0.010 | | |
| 23 | 6.144 | 0.477 | 1.4970 | 81.5 |
| 24 | −1.396 | (MOVEMENT 5) | | |
| 25* | −4.553 | 0.156 | 1.4910 | 57.6 |
| 26* | −52.392 | 0.014 | | |
| 27 | −8.957 | 0.205 | 1.8052 | 25.4 |
| 28 | −2.688 | 1.874 | | |
| 29 | ∞ | 1.690 | 1.5163 | 64.1 |
| 30 | ∞ | | | |

| MOVEMENT INTERVAL | WIDE END | MIDDLE POSITION | TELE END |
|---|---|---|---|
| MOVEMENT 1 | 0.581 | 0.302 | 0.293 |
| MOVEMENT 2 | 2.264 | 1.218 | 0.040 |
| MOVEMENT 3 | 0.375 | 1.019 | 1.269 |
| MOVEMENT 4 | 0.345 | 0.142 | 0.147 |
| MOVEMENT 5 | 0.023 | 0.907 | 1.838 |

*IS ASPHERIC

TABLE 6

ASPHERIC COEFFICIENT

| SURFACE NUMBER | K | $A_3$ | $A_4$ | $A_5$ | $A_6$ |
|---|---|---|---|---|---|
| 1 | 3.41481 | −1.95122E−02 | 3.89318E−01 | −2.21177E−01 | −3.72573E−02 |

| | $A_7$ | $A_8$ | $A_9$ | $A_{10}$ | $A_{11}$ |
|---|---|---|---|---|---|
| | 7.86534E−02 | 6.17284E−03 | −2.05624E−02 | −4.12282E−03 | 8.34529E−03 |

| $A_{12}$ |
|---|
| −1.68025E−03 |

| | K | $A_3$ | $A_4$ | $A_5$ | $A_6$ |
|---|---|---|---|---|---|
| 2 | 1.21545 | −1.74420E−02 | 3.62126E−01 | −2.43184E−01 | 2.01088E−02 |

| | $A_7$ | $A_8$ | $A_9$ | $A_{10}$ | $A_{11}$ |
|---|---|---|---|---|---|
| | 2.09668E−02 | 3.59892E−03 | −2.28955E−03 | −1.24320E−03 | 1.48309E−03 |

| $A_{12}$ |
|---|
| −1.05939E−03 |

| | K | $A_4$ | $A_6$ | $A_8$ | $A_{10}$ |
|---|---|---|---|---|---|
| 15 | 1.00000 | −8.69374E−02 | −8.76185E−02 | −2.00536E−01 | 4.65857E−01 |

| | K | $A_4$ | $A_6$ | $A_8$ | $A_{10}$ |
|---|---|---|---|---|---|
| 16 | 1.00000 | −5.02330E−02 | −3.01175E−02 | −2.62216E−01 | 3.90774E−01 |

| | K | $A_3$ | $A_4$ | $A_5$ | $A_6$ |
|---|---|---|---|---|---|
| 25 | 1.00000 | 0.00000E+00 | −2.00762E−01 | 1.77669E−02 | 7.83070E−02 |

| | $A_7$ | $A_8$ | $A_9$ | $A_{10}$ |
|---|---|---|---|---|
| | 5.11123E−03 | −1.89020E−02 | 9.68672E−04 | −1.41954E−03 |

| | K | $A_3$ | $A_4$ | $A_5$ | $A_6$ |
|---|---|---|---|---|---|
| 26 | 1.00000 | 0.00000E+00 | −1.81453E−01 | 3.27399E−02 | 6.63067E−02 |

| | $A_7$ | $A_8$ | $A_9$ | $A_{10}$ |
|---|---|---|---|---|
| | 1.68995E−02 | −1.64092E−02 | −2.47189E−02 | 1.39104E−02 |

According to the zoom lens for projection of Example 3, all of the formulas (1) through (4), (1'), (1"), (2'), (2"), (4') and (4") are satisfied, as Table 17 shows.

FIGS. 11A through 11L are diagrams illustrating aberrations of the zoom lens for projection of Example 3 at the wide angle end (wide), a middle position (middle), the telescopic end (tele). FIGS. 11A through 11L illustrate spherical aberrations, astigmatic aberrations, distortions and lateral chromatic aberrations.

As these diagrams illustrating aberration clearly show, the zoom lens for projection of Example 3 can remarkably reduce a variation in various kinds of aberrations, such as spherical aberration and astigmatic aberration, caused by zooming. Further, it is possible to correct the aberrations in an extremely efficient manner.

Example 4

Figure 4:
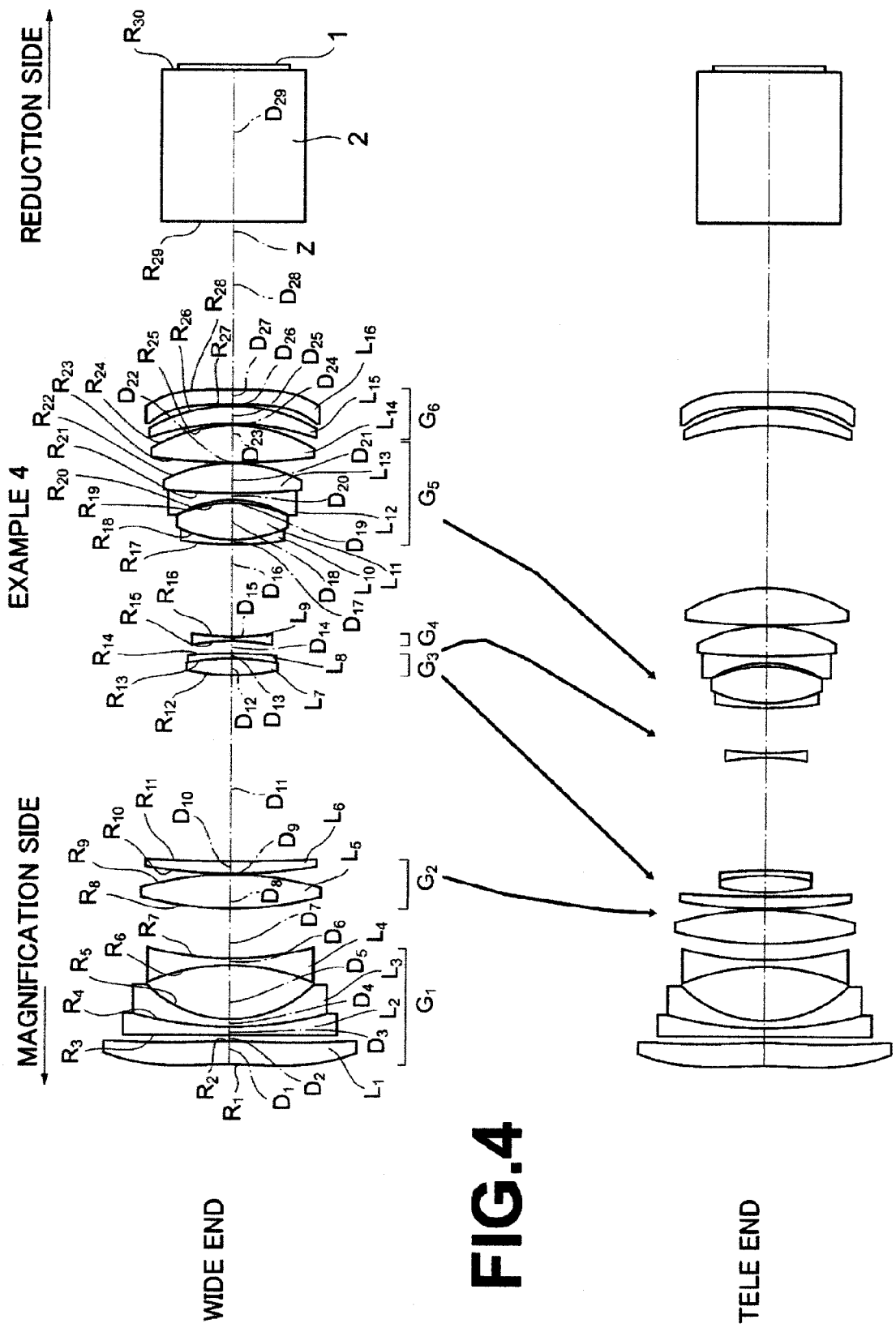
FIG. 4 is a diagram illustrating the structure of lenses in a zoom lens for projection of Example 4, and movement positions of respective lens groups at a wide angle end (wide) and a telescopic end (tele)

FIG. 4 is a diagram illustrating movement positions and movement paths of respective lens groups at a wide angle end (wide) and a telescopic end (tele) in a zoom lens for projection of Example 4.

The zoom lens for projection of Example 4 includes six lens groups in a manner basically similar to the zoom lens for projection of Example 1. However, the zoom lens for projection of Example 4 differs from the zoom lens for projection of Example 1 in that the second lens $L_2$ in the first lens group $G_1$ is a plano-concave lens. Further, in the zoom lens for projection of Example 4, the fifteenth lens $L_{15}$ in the sixth lens group $G_6$ is a positive meniscus lens having a convex surface facing the reduction side, while the sixteenth lens $L_{16}$ in the six lens group $G_6$ is a double aspheric lens.

As illustrated in FIG. 4, in a manner substantially similar to Example 1, when the magnification is changed, the first lens group $G_1$ and the sixth lens group $G_6$ are fixed groups, and the second lens group $G_2$ through the fifth lens group $G_5$ are movable groups.

Further, the reduction side is substantially telecentric.

Table 7 shows values of curvature radius R of each lens surface of the zoom lens for projection, axial surface interval D for each lens, and refractive index N and Abbe number ν of each lens for d-line.

The lower section of Table 7 shows intervals between lens groups at a wide angle end (wide), a middle position (middle), and a telescopic end (tele). Further, Table 8 shows aspheric coefficients representing respective aspheric surfaces.

TABLE 7

| FOCAL LENGTH F = 1.00~1.54~2.10 | | | |
|---|---|---|---|
| R | D | Nd | νd |

| | R | D | Nd | νd |
|---|---|---|---|---|
| 1* | −6.386 | 0.258 | 1.4910 | 57.6 |
| 2* | −6.180 | 0.072 | | |
| 3 | ∞ | 0.094 | 1.8081 | 22.8 |
| 4 | 3.963 | 0.087 | 1.5891 | 61.1 |
| 5 | 1.312 | 0.600 | | |
| 6 | −2.345 | 0.078 | 1.4970 | 81.5 |
| 7 | 3.540 | (MOVEMENT 1) | | |
| 8 | 3.914 | 0.376 | 1.5955 | 39.2 |
| 9 | −3.492 | 0.010 | | |
| 10 | 5.577 | 0.136 | 1.8052 | 25.4 |
| 11 | 18.581 | (MOVEMENT 2) | | |
| 12 | 2.469 | 0.187 | 1.6200 | 36.3 |
| 13 | −2.469 | 0.054 | 1.8052 | 25.4 |
| 14 | −5.604 | (MOVEMENT 3) | | |
| 15 | −2.420 | 0.049 | 1.6204 | 60.3 |
| 16 | 3.293 | (MOVEMENT 4) | | |
| 17 | 3.688 | 0.056 | 1.8340 | 37.2 |
| 18 | 1.445 | 0.408 | 1.4970 | 81.5 |
| 19 | −1.445 | 0.036 | | |
| 20 | −1.194 | 0.073 | 1.8340 | 37.2 |
| 21 | 7.187 | 0.336 | 1.4970 | 81.5 |
| 22 | −1.626 | 0.009 | | |
| 23 | 7.038 | 0.411 | 1.4970 | 81.5 |
| 24 | −1.724 | (MOVEMENT 5) | | |
| 25 | −2.815 | 0.198 | 1.8052 | 25.4 |
| 26 | −1.837 | 0.014 | | |
| 27* | −23.727 | 0.165 | 1.4910 | 57.6 |
| 28* | 101.544 | 1.872 | | |
| 29 | ∞ | 1.690 | 1.5163 | 64.1 |
| 30 | ∞ | | | |

| MOVEMENT INTERVAL | WIDE END | MIDDLE POSITION | TELE END |
|---|---|---|---|
| MOVEMENT 1 | 0.554 | 0.243 | 0.186 |
| MOVEMENT 2 | 2.078 | 1.310 | 0.046 |
| MOVEMENT 3 | 0.139 | 0.935 | 1.263 |
| MOVEMENT 4 | 1.020 | 0.502 | 0.503 |
| MOVEMENT 5 | 0.020 | 0.821 | 1.813 |

*IS ASPHERIC

TABLE 8

| ASPHERIC COEFFICIENT | | | | | |
|---|---|---|---|---|---|
| SURFACE NUMBER | K | $A_3$ | $A_4$ | $A_5$ | $A_6$ |
| 1 | 16.94258 | −8.06640E−03 | 2.20829E−01 | −1.10864E−01 | −3.92618E−02 |
| | $A_7$ | $A_8$ | $A_9$ | $A_{10}$ | $A_{11}$ |
| | 6.06818E−02 | −3.54785E−03 | −1.69356E−02 | −1.31120E−03 | 9.48391E−03 |
| | $A_{12}$ | | | | |
| | −3.10990E−03 | | | | |
| | K | $A_3$ | $A_4$ | $A_5$ | $A_6$ |
| 2 | −8.18860 | −6.29397E−03 | 1.89092E−01 | −1.33392E−01 | 5.92269E−03 |

TABLE 8-continued

| ASPHERIC COEFFICIENT | | | | |
|---|---|---|---|---|
| $A_7$ | $A_8$ | $A_9$ | $A_{10}$ | $A_{11}$ |
| 9.55112E−03 | 2.56187E−03 | −1.55805E−03 | −4.26487E−04 | 3.03065E−03 |

| $A_{12}$ |
|---|
| −1.84422E−03 |

| | K | $A_3$ | $A_4$ | $A_5$ | $A_6$ |
|---|---|---|---|---|---|
| 27 | 1.00000 | 0.00000E+00 | −2.41684E−01 | −9.06829E−02 | 4.80509E−02 |

| $A_7$ | $A_8$ | $A_9$ | $A_{10}$ |
|---|---|---|---|
| 5.73358E−02 | −1.17728E−02 | −5.70040E−02 | 4.23772E−02 |

| | K | $A_3$ | $A_4$ | $A_5$ | $A_6$ |
|---|---|---|---|---|---|
| 28 | 1.00000 | 0.00000E+00 | −2.25678E−01 | −1.02322E−01 | 1.01576E−01 |

| $A_7$ | $A_8$ | $A_9$ | $A_{10}$ |
|---|---|---|---|
| 4.66553E−02 | −2.70768E−02 | −3.39232E−02 | 2.53492E−02 |

According to the zoom lens for projection of Example 4, all of the formulas (1) through (4), (1'), (1"), (2'), (2"), (4') and (4") are satisfied, as Table 17 shows.

FIGS. 12A through 12L are diagrams illustrating aberrations of the zoom lens for projection of Example 4 at the wide angle end (wide), a middle position (middle), the telescopic end (tele). FIGS. 12A through 12L illustrate spherical aberrations, astigmatic aberrations, distortions and lateral chromatic aberrations.

As these diagrams illustrating aberration clearly show, the zoom lens for projection of Example 4 can remarkably reduce a variation in various kinds of aberrations, such as spherical aberration and astigmatic aberration, caused by zooming. Further, it is possible to correct the aberrations in an extremely efficient manner.

Example 5

Figure 5:
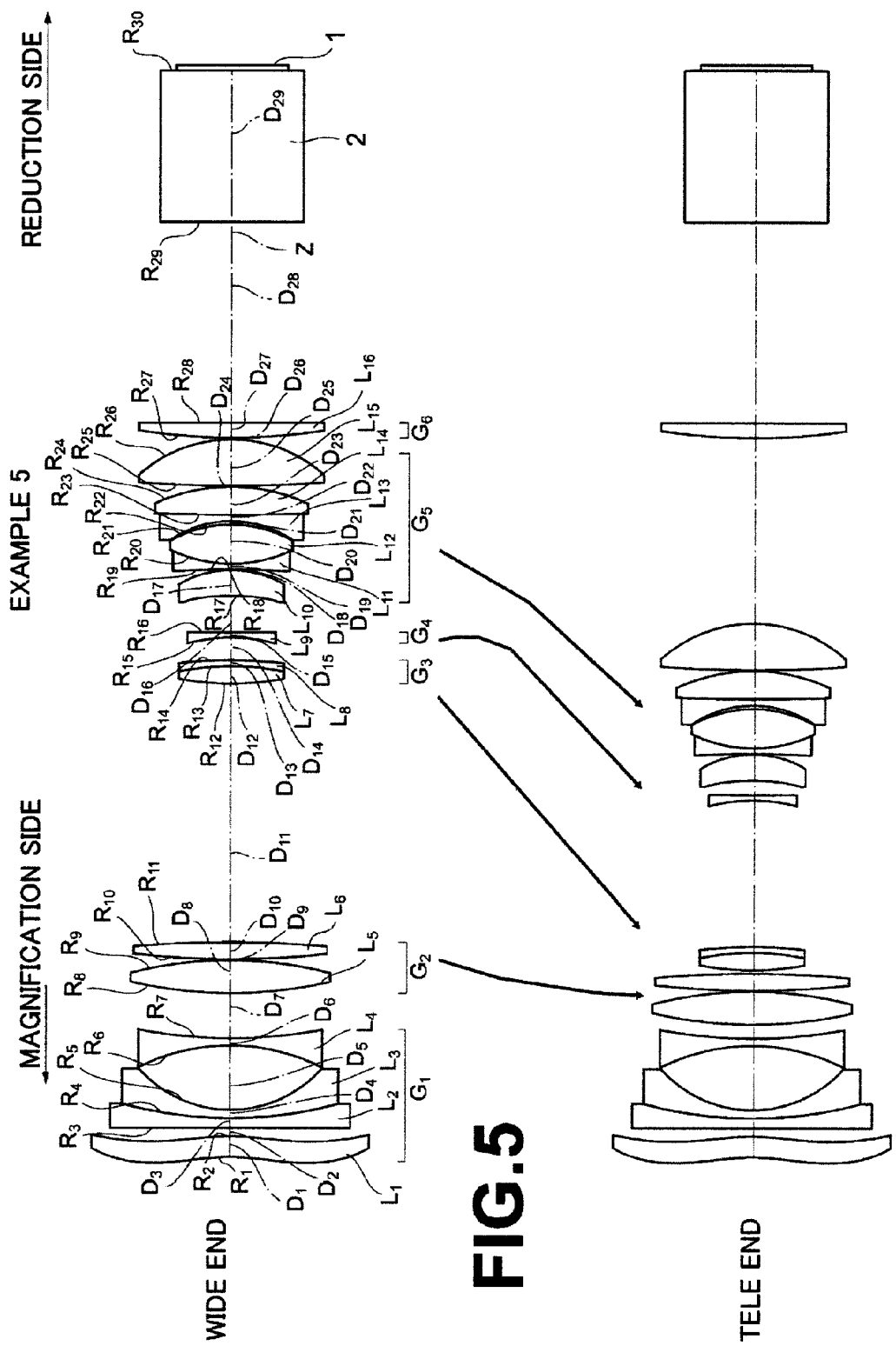
FIG. 5 is a diagram illustrating the structure of lenses in a zoom lens for projection of Example 5, and movement positions of respective lens groups at a wide angle end (wide) and a telescopic end (tele)

FIG. 5 is a diagram illustrating movement positions and movement paths of respective lens groups at a wide angle end (wide) and a telescopic end (tele) in a zoom lens for projection of Example 5.

The zoom lens for projection of Example 5 includes six lens groups in a manner basically similar to the zoom lens for projection of Example 2. However, the zoom lens for projection of Example 5 differs from the zoom lens for projection of Example 2 in that the eleventh lens $L_{11}$ in the fifth lens group $G_5$ is a double-concave lens, and that the sixth lens group $G_6$ includes only the sixteenth lens $L_{16}$, which is a plano-convex lens having a convex surface facing the magnification side.

As illustrated in FIG. 5, in a manner substantially similar to Example 1, when the magnification is changed, the first lens group $G_1$ and the sixth lens group $G_6$ are fixed groups, and the second lens group $G_2$ through the fifth lens group $G_5$ are movable groups.

Further, the reduction side is substantially telecentric.

Table 9 shows values of curvature radius R of each lens surface of the zoom lens for projection, axial surface interval D for each lens, and refractive index N and Abbe number ν of each lens for d-line.

The lower section of Table 9 shows intervals between lens groups at a wide angle end (wide), a middle position (middle), and a telescopic end (tele). Further, Table 10 shows aspheric coefficients representing respective aspheric surfaces.

TABLE 9

| FOCAL LENGTH F = 1.00~1.50~2.10 | | | |
|---|---|---|---|
| | R | D | Nd | vd |
| 1* | −2.323 | 0.238 | 1.4910 | 57.6 |
| 2* | −2.599 | 0.094 | | |
| 3 | ∞ | 0.114 | 1.8081 | 22.8 |
| 4 | 4.645 | 0.095 | 1.6180 | 63.3 |
| 5 | 1.377 | 0.734 | | |
| 6 | −2.288 | 0.081 | 1.4970 | 81.5 |
| 7 | 5.483 | (MOVEMENT 1) | | |
| 8 | 4.907 | 0.376 | 1.6200 | 36.3 |
| 9 | −4.545 | 0.010 | | |
| 10 | 9.576 | 0.195 | 1.6990 | 30.1 |
| 11 | −12.726 | (MOVEMENT 2) | | |
| 12 | 3.201 | 0.199 | 1.5955 | 39.2 |
| 13 | −2.959 | 0.068 | 1.8052 | 25.4 |
| 14 | −5.317 | (MOVEMENT 3) | | |
| 15 | −1.962 | 0.060 | 1.8040 | 46.6 |
| 16 | 64.100 | (MOVEMENT 4) | | |
| 17* | −2.947 | 0.293 | 1.5686 | 58.6 |
| 18* | −1.274 | 0.009 | | |
| 19 | −9.729 | 0.064 | 1.8040 | 46.6 |
| 20 | 1.611 | 0.447 | 1.4970 | 81.5 |
| 21 | −1.402 | 0.039 | | |
| 22 | −1.226 | 0.072 | 1.8061 | 40.9 |
| 23 | 23.886 | 0.319 | 1.4970 | 81.5 |
| 24 | −2.062 | 0.010 | | |
| 25 | 14.472 | 0.529 | 1.4970 | 81.5 |
| 26 | −1.567 | (MOVEMENT 5) | | |
| 27 | 6.945 | 0.167 | 1.8052 | 25.4 |
| 28 | ∞ | 2.275 | | |
| 29 | ∞ | 1.716 | 1.5163 | 64.1 |
| 30 | ∞ | | | |

| MOVEMENT INTERVAL | WIDE END | MIDDLE POSITION | TELE END |
|---|---|---|---|
| MOVEMENT 1 | 0.513 | 0.212 | 0.163 |
| MOVEMENT 2 | 2.936 | 1.638 | 0.038 |
| MOVEMENT 3 | 0.256 | 1.249 | 1.663 |
| MOVEMENT 4 | 0.411 | 0.166 | 0.166 |
| MOVEMENT 5 | 0.021 | 0.871 | 2.107 |

*IS ASPHERIC

TABLE 10

ASPHERIC COEFFICIENT

| SURFACE NUMBER | K | $A_3$ | $A_4$ | $A_5$ | $A_6$ |
|---|---|---|---|---|---|
| 1 | 1.54123 | −6.23864E−03 | 3.42730E−01 | −1.81621E−01 | −2.03048E−02 |
| | | $A_7$ | $A_8$ | $A_9$ | $A_{10}$ | $A_{11}$ |
| | | 3.80876E−02 | 6.77609E−03 | −6.38258E−03 | −2.98989E−03 | 2.01084E−03 |
| | | $A_{12}$ | | | | |
| | | −9.51649E−05 | | | | |
| | K | $A_3$ | $A_4$ | $A_5$ | $A_6$ |
| 2 | −0.86615 | −4.33948E−04 | 2.69552E−01 | −1.36321E−01 | −2.44915E−02 |
| | | $A_7$ | $A_8$ | $A_9$ | $A_{10}$ | $A_{11}$ |
| | | 1.23757E−02 | 8.94411E−03 | 1.34887E−03 | −1.80234E−03 | −7.85928E−04 |
| | | $A_{12}$ | | | | |
| | | 2.95652E−04 | | | | |
| | K | $A_4$ | $A_6$ | $A_8$ | $A_{10}$ |
| 17 | 1.00000 | −1.76829E−01 | −1.22854E−01 | −2.32882E−01 | −1.00256E−01 |
| | K | $A_4$ | $A_6$ | $A_8$ | $A_{10}$ |
| 18 | 1.00000 | −7.95212E−02 | −6.53347E−02 | −1.24811E−01 | −8.90628E−02 |

According to the zoom lens for projection of Example 5, all of the formulas (1) through (4), (1'), (1"), (2'), (2"), (4') and (4") are satisfied, as Table 17 shows.

FIGS. 13A through 13L are diagrams illustrating aberrations of the zoom lens for projection of Example 5 at the wide angle end (wide), a middle position (middle), the telescopic end (tele). FIGS. 13A through 13L illustrate spherical aberrations, astigmatic aberrations, distortions and lateral chromatic aberrations.

As these diagrams illustrating aberration clearly show, the zoom lens for projection of Example 5 can remarkably reduce a variation in various kinds of aberrations, such as spherical aberration and astigmatic aberration, caused by zooming. Further, it is possible to correct the aberrations in an extremely efficient manner.

Example 6

Figure 6:
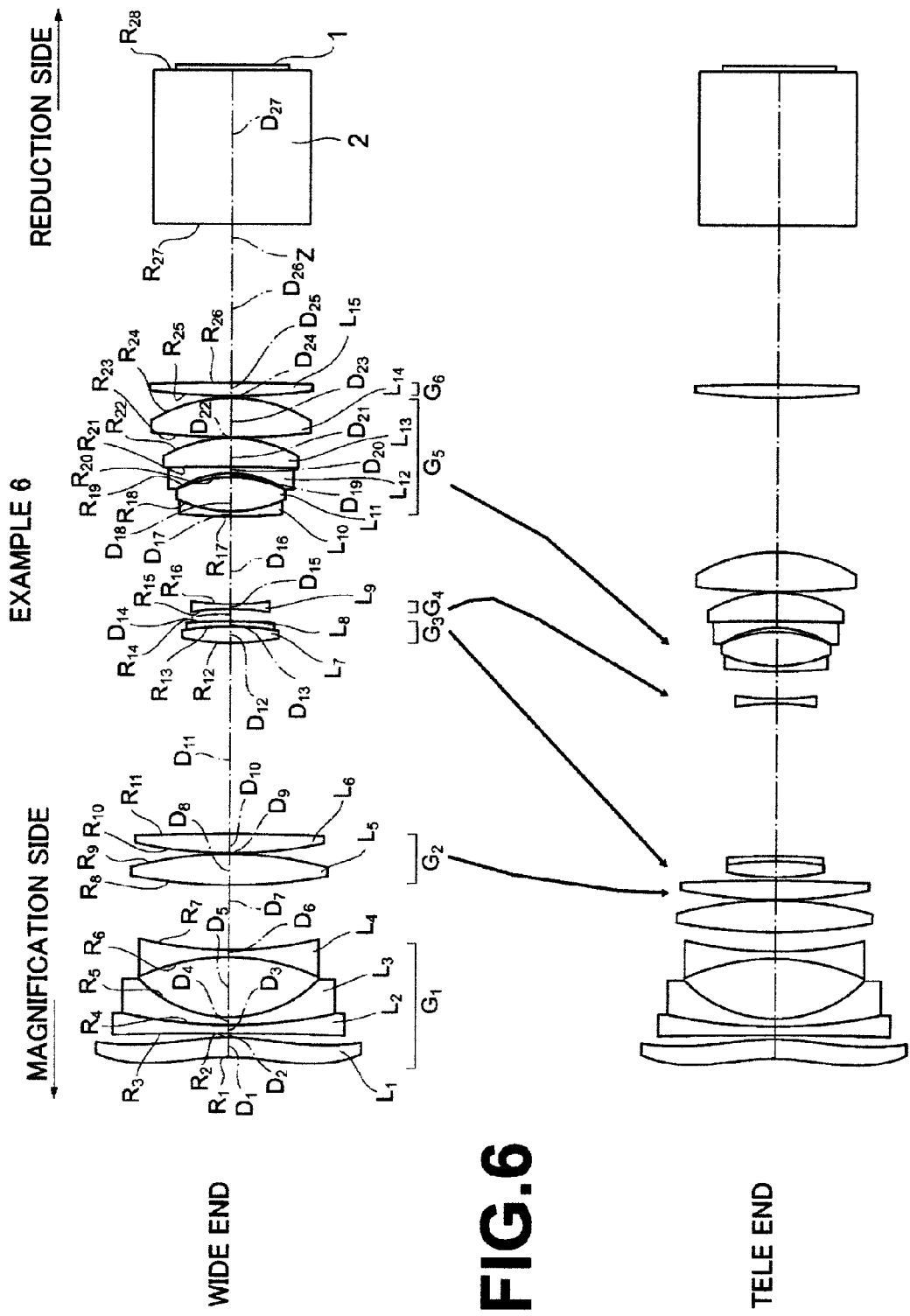
FIG. 6 is a diagram illustrating the structure of lenses in a zoom lens for projection of Example 6, and movement positions of respective lens groups at a wide angle end (wide) and a telescopic end (tele)

FIG. 6 is a diagram illustrating movement positions and movement paths of respective lens groups at a wide angle end (wide) and a telescopic end (tele) in a zoom lens for projection of Example 6.

The zoom lens for projection of Example 6 includes six lens groups in a manner basically similar to the zoom lens for projection of Example 1. However, the zoom lens for projection of Example 6 differs from the zoom lens for projection of Example 1 in that the second lens $L_2$ in the first lens group $G_1$ is a double-concave lens, and that the sixth lens $L_6$ in the second lens group $G_2$ is a double-convex lens. Further, the zoom lens for projection of Example 6 differs from the zoom lens for projection of Example 1 in that the thirteenth lens $L_{13}$ in the fifth lens group $G_5$ is a positive meniscus lens having a convex surface facing the reduction side, and that the sixth lens group $G_6$ includes only the fifteenth lens $L_{15}$, which is a double-convex lens.

As illustrated in FIG. 6, in a manner substantially similar to Example 1, when the magnification is changed, the first lens group $G_1$ and the sixth lens group $G_6$ are fixed groups, and the second lens group $G_2$ through the fifth lens group $G_5$ are movable groups.

Further, the reduction side is substantially telecentric.

Table 11 shows values of curvature radius R of each lens surface of the zoom lens for projection, axial surface interval D for each lens, and refractive index N and Abbe number ν of each lens for d-line.

The lower section of Table 11 shows intervals between lens groups at a wide angle end (wide), a middle position (middle), and a telescopic end (tele). Further, Table 12 shows aspheric coefficients representing respective aspheric surfaces.

TABLE 11

FOCAL LENGTH: F = 1.00~1.54~2.10

| | R | D | Nd | νd |
|---|---|---|---|---|
| 1* | −2.219 | 0.218 | 1.4910 | 57.6 |
| 2* | −2.321 | 0.046 | | |
| 3 | −46.945 | 0.094 | 1.8081 | 22.8 |
| 4 | 5.430 | 0.085 | 1.5163 | 64.1 |
| 5 | 1.370 | 0.662 | | |
| 6 | −2.308 | 0.078 | 1.4970 | 81.5 |
| 7 | 4.137 | (MOVEMENT 1) | | |
| 8 | 5.744 | 0.343 | 1.5955 | 39.2 |
| 9 | −4.007 | 0.010 | | |
| 10 | 4.983 | 0.210 | 1.6727 | 32.1 |
| 11 | −23.364 | (MOVEMENT 2) | | |
| 12 | 2.663 | 0.177 | 1.5673 | 42.8 |
| 13 | −3.372 | 0.057 | 1.8052 | 25.4 |
| 14 | −6.761 | (MOVEMENT 3) | | |
| 15 | −2.600 | 0.052 | 1.5481 | 45.8 |
| 16 | 3.057 | (MOVEMENT 4) | | |
| 17 | 6.293 | 0.059 | 1.8040 | 46.6 |
| 18 | 1.385 | 0.377 | 1.4970 | 81.5 |

TABLE 11-continued

FOCAL LENGTH: F = 1.00~1.54~2.10

| | | | | |
|---|---|---|---|---|
| 19 | −1.381 | 0.044 | | |
| 20 | −1.101 | 0.070 | 1.8340 | 37.2 |
| 21 | −31.620 | 0.315 | 1.4970 | 81.5 |
| 22 | −1.476 | 0.009 | | |
| 23 | 7.767 | 0.434 | 1.4970 | 81.5 |
| 24 | −1.670 | (MOVEMENT 5) | | |
| 25 | 6.995 | 0.147 | 1.8052 | 25.4 |
| 26 | −24.648 | 1.732 | | |
| 27 | ∞ | 1.690 | 1.5163 | 64.1 |
| 28 | ∞ | | | |

| MOVEMENT INTERVAL | WIDE END | MIDDLE POSITION | TELE END |
|---|---|---|---|
| MOVEMENT 1 | 0.711 | 0.321 | 0.220 |
| MOVEMENT 2 | 2.106 | 1.251 | 0.037 |
| MOVEMENT 3 | 0.136 | 1.154 | 1.683 |
| MOVEMENT 4 | 0.964 | 0.398 | 0.298 |
| MOVEMENT 5 | 0.022 | 0.813 | 1.701 |

*IS ASPHERIC

TABLE 12

ASPHERIC COEFFICIENT

| SURFACE NUMBER | K | $A_3$ | $A_4$ | $A_5$ | $A_6$ |
|---|---|---|---|---|---|
| 1 | 0.75345 | −2.34447E−02 | 3.99734E−01 | −2.35035E−01 | −3.86790E−02 |

| | $A_7$ | $A_8$ | $A_9$ | $A_{10}$ | $A_{11}$ |
|---|---|---|---|---|---|
| | 7.89696E−02 | 1.73114E−03 | −1.87743E−02 | −3.89326E−03 | 8.13871E−03 |

| | $A_{12}$ |
|---|---|
| | −1.90757E−03 |

| | K | $A_3$ | $A_4$ | $A_5$ | $A_6$ |
|---|---|---|---|---|---|
| 2 | −4.07447 | −1.93169E−02 | 3.05063E−01 | −2.17535E−01 | 1.49264E−02 |

| | $A_7$ | $A_8$ | $A_9$ | $A_{10}$ | $A_{11}$ |
|---|---|---|---|---|---|
| | 2.06471E−02 | 3.49502E−03 | −3.57396E−03 | −1.61202E−03 | 2.85838E−03 |

| | $A_{12}$ |
|---|---|
| | −1.05097E−03 |

According to the zoom lens for projection of Example 6, all of the formulas (1) through (4), (1'), (1"), (2'), (2"), (4') and (4") are satisfied, as Table 17 shows.

FIGS. 14A through 14L are diagrams illustrating aberrations of the zoom lens for projection of Example 6 at the wide angle end (wide), a middle position (middle), the telescopic end (tele). FIGS. 14A through 14L illustrate spherical aberrations, astigmatic aberrations, distortions and lateral chromatic aberrations.

As these diagrams illustrating aberration clearly show, the zoom lens for projection of Example 6 can remarkably reduce a variation in various kinds of aberrations, such as spherical aberration and astigmatic aberration, caused by zooming. Further, it is possible to correct the aberrations in an extremely efficient manner.

Example 7

Figure 7:
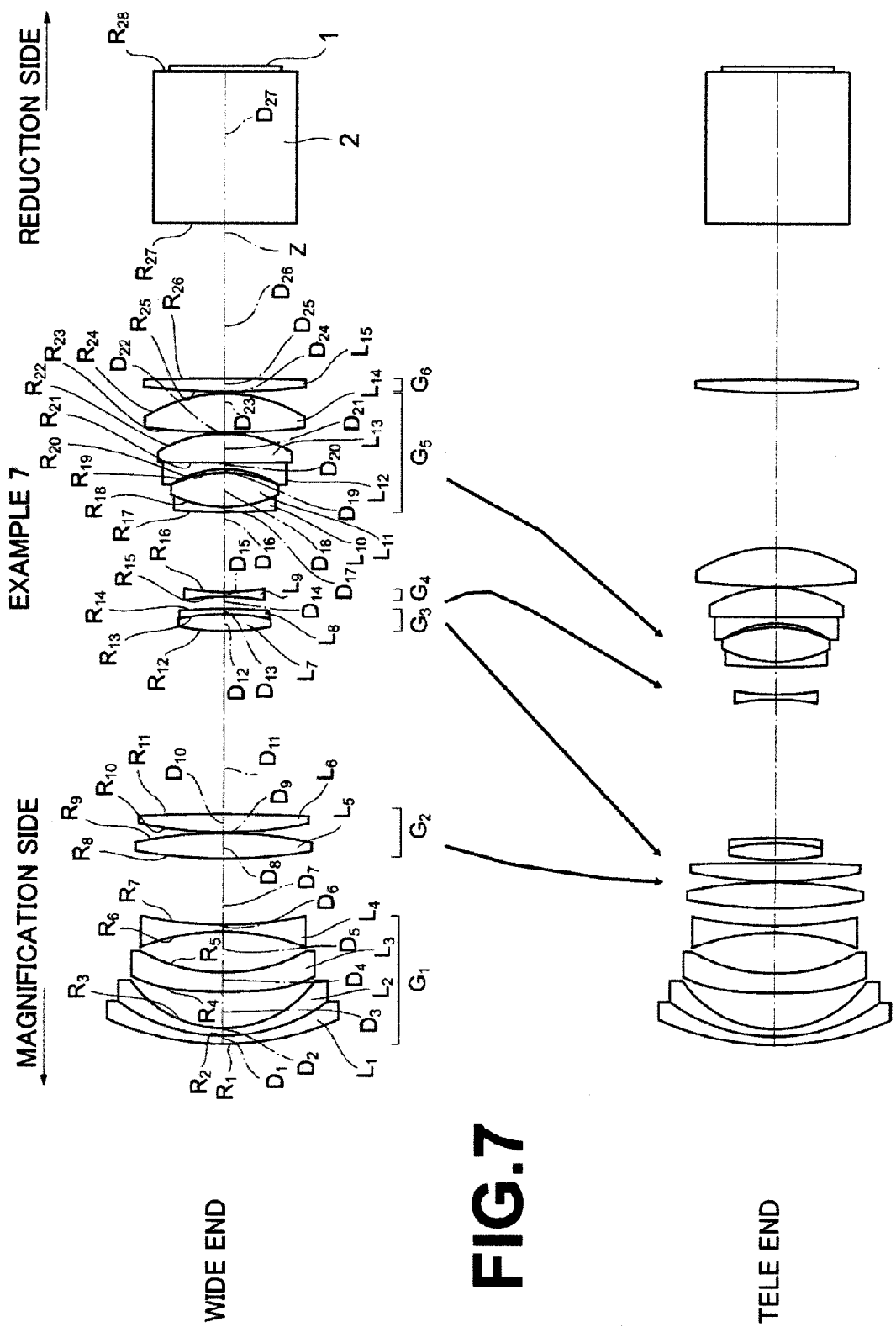
FIG. 7 is a diagram illustrating the structure of lenses in a zoom lens for projection of Example 7, and movement positions of respective lens groups at a wide angle end (wide) and a telescopic end (tele)

FIG. 7 is a diagram illustrating movement positions and movement paths of respective lens groups at a wide angle end (wide) and a telescopic end (tele) in a zoom lens for projection of Example 7.

The zoom lens for projection of Example 7 includes six lens groups in a manner basically similar to the zoom lens for projection of Example 6. However, the zoom lens for projection of Example 7 differs from the zoom lens for projection of Example 6 in that the first lens group $G_1$ is composed of the first lens $L_1$, which is a negative meniscus lens having a convex surface facing the magnification side, the second lens $L_2$, which is a negative meniscus lens having a convex surface facing the magnification side, the third lens $L_3$/which is a double-aspheric lens, and the fourth lens $L_4$/which is a double-concave lens, the first through fourth lenses $L_1$ through $L_4$ being sequentially arranged from the magnification side, and that the first lens $L_1$ and the second lens $L_2$ are cemented together to form a cemented lens. Further, the zoom lens for projection of Example 7 differs from the zoom lens for projection of Example 6 in that the twelfth lens $L_{12}$ in the fifth lens group $G_5$ is a double-concave lens, while the thirteenth lens $L_{13}$ in the fifth lens group $G_5$ is a double-convex lens.

As illustrated in FIG. 7, in a manner substantially similar to Example 1, when the magnification is changed, the first lens group $G_1$ and the sixth lens group $G_6$ are fixed groups, and the second lens group $G_2$ through the fifth lens group $G_5$ are movable groups.

Further, the reduction side is substantially telecentric.

Table 13 shows values of curvature radius R of each lens surface of the zoom lens for projection, axial surface interval D for each lens, and refractive index N and Abbe number v of each lens for d-line.

The lower section of Table 13 shows intervals between lens groups at a wide angle end (wide), a middle position (middle), and a telescopic end (tele). Further, Table 14 shows aspheric coefficients representing respective aspheric surfaces.

TABLE 13

FOCAL LENGTH: F = 1.00~1.54~2.10

| | R | D | Nd | vd |
|---|---|---|---|---|
| 1 | 3.078 | 0.094 | 1.8081 | 22.8 |
| 2 | 1.937 | 0.085 | 1.6180 | 63.3 |
| 3 | 1.249 | 0.410 | | |
| 4* | 15.748 | 0.218 | 1.4910 | 57.6 |
| 5* | 2.556 | 0.449 | | |
| 6 | −2.586 | 0.078 | 1.4970 | 81.5 |
| 7 | 4.272 | (MOVEMENT 1) | | |
| 8 | 5.611 | 0.286 | 1.5955 | 39.2 |
| 9 | −4.593 | 0.010 | | |
| 10 | 4.582 | 0.200 | 1.6477 | 33.8 |
| 11 | −25.188 | (MOVEMENT 2) | | |
| 12 | 2.695 | 0.189 | 1.6034 | 38.0 |
| 13 | −2.420 | 0.056 | 1.8052 | 25.4 |
| 14 | −5.520 | (MOVEMENT 3) | | |
| 15 | −2.592 | 0.052 | 1.5174 | 52.4 |
| 16 | 2.896 | (MOVEMENT 4) | | |
| 17 | 6.718 | 0.059 | 1.8000 | 45.8 |
| 18 | 1.337 | 0.382 | 1.4970 | 81.5 |
| 19 | −1.377 | 0.042 | | |
| 20 | −1.105 | 0.070 | 1.8340 | 37.2 |
| 21 | 101.530 | 0.327 | 1.4970 | 81.5 |
| 22 | −1.468 | 0.009 | | |
| 23 | 7.152 | 0.433 | 1.4970 | 81.5 |
| 24 | −1.654 | (MOVEMENT 5) | | |
| 25 | 7.598 | 0.147 | 1.8052 | 25.4 |
| 26 | −25.045 | 1.732 | | |
| 27 | ∞ | 1.689 | 1.5163 | 64.1 |
| 28 | ∞ | | | |

| MOVEMENT INTERVAL | WIDE END | MIDDLE POSITION | TELE END |
|---|---|---|---|
| MOVEMENT 1 | 0.735 | 0.291 | 0.204 |
| MOVEMENT 2 | 2.044 | 1.161 | 0.037 |
| MOVEMENT 3 | 0.133 | 1.091 | 1.548 |
| MOVEMENT 4 | 0.891 | 0.426 | 0.309 |
| MOVEMENT 5 | 0.022 | 0.856 | 1.728 |

*IS ASPHERIC

According to the zoom lens for projection of Example 7, all of the formulas (1) through (4), (1'), (1"), (2'), (2"), (4') and (4") are satisfied, as Table 17 shows.

FIGS. 15A through 15L are diagrams illustrating aberrations of the zoom lens for projection of Example 7 at the wide angle end (wide), a middle position (middle), the telescopic end (tele). FIGS. 15A through 15L illustrate spherical aberrations, astigmatic aberrations, distortions and lateral chromatic aberrations.

As these diagrams illustrating aberration clearly show, the zoom lens for projection of Example 7 can remarkably reduce a variation in various kinds of aberrations, such as spherical aberration and astigmatic aberration, caused by zooming. Further, it is possible to correct the aberrations in an extremely efficient manner.

Example 8

Figure 8:
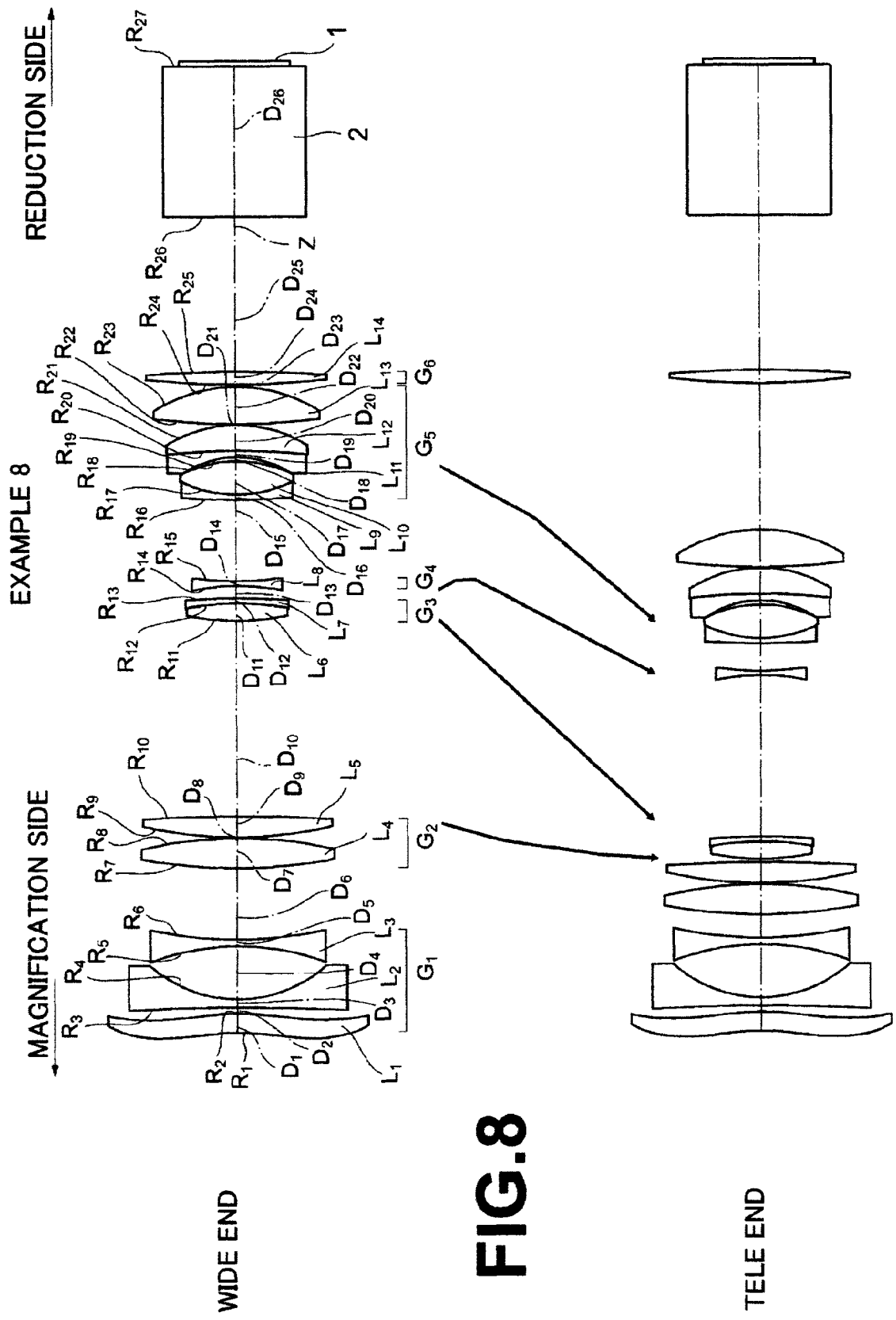
FIG. 8 is a diagram illustrating the structure of lenses in a zoom lens for projection of Example 8, and movement positions of respective lens groups at a wide angle end (wide) and a telescopic end (tele)

FIG. 8 is a diagram illustrating movement positions and movement paths of respective lens groups at a wide angle end (wide) and a telescopic end (tele) in a zoom lens for projection of Example 8.

The zoom lens for projection of Example 8 includes six lens groups in a manner basically similar to the zoom lens for projection of Example 6. However, the zoom lens for projection of Example 8 differs from the zoom lens for projection of Example 6 in that the first lens group $G_1$ is composed of the first lens $L_1$, which is a double-aspheric lens, the second lens $L_2$, which is a double-concave lens, and the third lens $L_3$, which is a double-concave lens, the first through third lenses $L_1$ through $L_3$ being sequentially arranged from the magnification side.

As illustrated in FIG. 8, in a manner substantially similar to Example 1, when the magnification is changed, the first lens group $G_1$ and the sixth lens group $G_6$ are fixed groups, and the second lens group $G_2$ through the fifth lens group $G_5$ are movable groups.

TABLE 14

ASPHERIC COEFFICIENT

| SURFACE NUMBER | K | $A_3$ | $A_4$ | $A_5$ | $A_6$ |
|---|---|---|---|---|---|
| 4 | 109.20818 | −3.43308E−03 | 2.63749E−01 | −1.22169E−02 | −3.11665E−01 |
| | $A_7$ | $A_8$ | $A_9$ | $A_{10}$ | $A_{11}$ |
| | 1.54259E−01 | 1.51678E−01 | −9.24327E−02 | −8.26828E−02 | 8.65208E−02 |
| | $A_{12}$ | | | | |
| | −2.56756E−02 | | | | |
| | K | $A_3$ | $A_4$ | $A_5$ | $A_6$ |
| 5 | 2.35682 | 6.00775E−03 | 1.66413E−01 | 1.57693E−01 | −5.57363E−01 |
| | $A_7$ | $A_8$ | $A_9$ | $A_{10}$ | $A_{11}$ |
| | 2.56234E−01 | 1.37658E−01 | −2.37595E−02 | −1.04673E−01 | −1.88770E−02 |
| | $A_{12}$ | | | | |
| | 3.25966E−02 | | | | |

Further, the reduction side is substantially telecentric.

Table 15 shows values of curvature radius R of each lens surface of the zoom lens for projection, axial surface interval D for each lens, and refractive index N and Abbe number ν of each lens for d-line.

The lower section of Table 15 shows intervals between lens groups at a wide angle end (wide), a middle position (middle), and a telescopic end (tele). Further, Table 16 shows aspheric coefficients representing respective aspheric surfaces.

According to the zoom lens for projection of Example 8, all of the formulas (1) through (4), (1'), (1"), (2'), (2"), (4') and (4") are satisfied, as Table 17 shows.

FIGS. 16A through 16L are diagrams illustrating aberrations of the zoom lens for projection of Example 8 at the wide angle end (wide), a middle position (middle), the telescopic end (tele). FIGS. 16A through 16L illustrate spherical aberrations, astigmatic aberrations, distortions and lateral chromatic aberrations.

As these diagrams illustrating aberration clearly show, the zoom lens for projection of Example 8 can remarkably reduce a variation in various kinds of aberrations, such as spherical aberration and astigmatic aberration, caused by zooming. Further, it is possible to correct the aberrations in an extremely efficient manner.

TABLE 15

FOCAL LENGTH F = 1.00~1.54~2.10

| | R | D | Nd | νd |
|---|---|---|---|---|
| 1* | −2.331 | 0.217 | 1.4910 | 57.6 |
| 2* | −2.393 | 0.070 | | |
| 3 | −21.642 | 0.094 | 1.6700 | 39.3 |
| 4 | 1.475 | 0.593 | | |
| 5 | −2.806 | 0.078 | 1.4970 | 81.5 |
| 6 | 4.424 | (MOVEMENT 1) | | |
| 7 | 5.854 | 0.336 | 1.5955 | 39.2 |
| 8 | −4.735 | 0.010 | | |
| 9 | 4.564 | 0.235 | 1.6129 | 37.0 |
| 10 | −17.461 | (MOVEMENT 2) | | |
| 11 | 2.801 | 0.194 | 1.5814 | 40.7 |
| 12 | −3.136 | 0.057 | 1.8052 | 25.4 |
| 13 | −6.766 | (MOVEMENT 3) | | |
| 14 | −2.438 | 0.052 | 1.5163 | 64.1 |
| 15 | 3.149 | (MOVEMENT 4) | | |
| 16 | 8.201 | 0.059 | 1.8340 | 37.2 |
| 17 | 1.417 | 0.375 | 1.4970 | 81.5 |
| 18 | −1.381 | 0.046 | | |
| 19 | −1.091 | 0.070 | 1.8340 | 37.2 |
| 20 | −7.507 | 0.293 | 1.4970 | 81.5 |
| 21 | −1.458 | 0.009 | | |
| 22 | 7.433 | 0.422 | 1.4970 | 81.5 |
| 23 | −1.702 | (MOVEMENT 5) | | |
| 24 | 8.719 | 0.147 | 1.8052 | 25.4 |
| 25 | −13.028 | 1.740 | | |
| 26 | ∞ | 1.690 | 1.5163 | 64.1 |
| 27 | ∞ | | | |

TABLE 15-continued

FOCAL LENGTH F = 1.00~1.54~2.10

| MOVEMENT INTERVAL | WIDE END | MIDDLE POSITION | TELE END |
|---|---|---|---|
| MOVEMENT 1 | 0.797 | 0.371 | 0.266 |
| MOVEMENT 2 | 2.197 | 1.251 | 0.037 |
| MOVEMENT 3 | 0.139 | 1.253 | 1.810 |
| MOVEMENT 4 | 0.913 | 0.427 | 0.307 |
| MOVEMENT 5 | 0.023 | 0.765 | 1.648 |

*IS ASPHERIC

TABLE 16

ASPHERIC COEFFICIENT

| SURFACE NUMBER | K | $A_3$ | $A_4$ | $A_5$ | $A_6$ |
|---|---|---|---|---|---|
| 1 | 0.59127 | −3.28408E−02 | 4.18965E−01 | −2.48854E−01 | −4.04159E−02 |
| | $A_7$ | $A_8$ | $A_9$ | $A_{10}$ | $A_{11}$ |
| | 8.41761E−02 | 8.78623E−04 | −1.99736E−02 | −3.60840E−03 | 8.69305E−03 |
| | $A_{12}$ | | | | |
| | −2.06312E−03 | | | | |
| | K | $A_3$ | $A_4$ | $A_5$ | $A_6$ |
| 2 | −2.62835 | −2.83673E−02 | 3.48898E−01 | −2.38443E−01 | 1.12074E−02 |
| | $A_7$ | $A_8$ | $A_9$ | $A_{10}$ | $A_{11}$ |
| | 2.07016E−02 | 5.02088E−03 | −2.25920E−03 | −1.19316E−03 | 2.65751E−03 |
| | $A_{12}$ | | | | |
| | −1.33643E−03 | | | | |

TABLE 17

| | (1)f4/fw | (2)bf/fw | (3)ft/fw | (4)ν5 |
|---|---|---|---|---|
| EXAMPLE 1 | −2.14 | 3.07 | 2.1 | 81.5 |
| EXAMPLE 2 | −2.04 | 3.41 | 2.3 | 75.8 |
| EXAMPLE 3 | −1.98 | 2.99 | 2.1 | 75.8 |
| EXAMPLE 4 | −2.24 | 2.99 | 2.1 | 81.5 |
| EXAMPLE 5 | −2.37 | 3.41 | 2.1 | 75.8 |
| EXAMPLE 6 | −2.56 | 2.85 | 2.1 | 81.5 |
| EXAMPLE 7 | −2.64 | 2.85 | 2.1 | 81.5 |
| EXAMPLE 8 | −2.65 | 2.85 | 2.1 | 81.5 |

The zoom lens for projection according to the present invention is not limited to the zoom lenses of the aforementioned examples, and various modifications are possible. For example, the curvature radius R of each lens and the axial surface interval D may be changed in an appropriate manner.

Further, the configuration of the projection-type display device according to the present invention is not limited to the aforementioned configuration. The projection-type display device of the present invention may be configured in various manners including the zoom lens for projection of the present invention. For example, as the light bulb, a transmission-type or reflection-type liquid crystal display device, or a micromirror device (for example, a digital micromirror device (DMD) produced by Texas Instruments Incorporated) may be used. In the micromirror device, a multiplicity of micromirrors, the direction of each of which is changeable, are arranged on a substantially flat surface. Further, an illumination optical system that has an appropriate structure corresponding to the kind of the light bulb may be adopted.

What is claimed is:

1. A zoom lens for projection comprising:
    a first lens group having a negative refractive power;
    a second lens group having a positive refractive power;
    a third lens group having a positive refractive power;
    a fourth lens group having a negative refractive power;
    a fifth lens group having a positive refractive power; and
    a sixth lens group having a positive refractive power, which are arranged from a magnification side of the zoom lens,
    wherein a reduction side of the zoom lens is telecentric, and
    wherein when the magnification of the zoom lens is changed, the first lens group and the sixth lens group are fixed, and each of the second lens group, the third lens group, the fourth lens group and the fifth lens group moves along the optical axis of the zoom lens, and
    wherein the fourth lens group is a negative lens having a concave surface facing the magnification side, and
    wherein the fifth lens group includes at least two positive lenses and at least two negative lenses, and
    wherein the following formula (1) is satisfied:

$$-5.0 \leq f4/fw \leq -1.2 \qquad (1),$$

where f4: the focal length of the fourth lens group; and
    fw: the focal length of the entire system of the zoom lens at a wide angle end.

2. A zoom lens for projection, as defined in claim 1, wherein the following formula (2) is satisfied:

$$2.0 \leq Bf/fw \leq 5.0 \qquad (2),$$

where Bf: back focus in air on the reduction side of the entire system of the zoom lens.

3. A zoom lens for projection, as defined in claim 1, wherein the following formula (3) is satisfied:

$$1.5 \leq ft/fw \qquad (3),$$

where ft: the focal length of the entire system of the zoom lens at a telescopic end.

4. A zoom lens for projection, as defined in claim 1, wherein the following formula (4) is satisfied:

$$55 v5 \qquad (4),$$

where v5: an average value of Abbe numbers of the positive lenses included in the fifth lens group.

5. A zoom lens for projection, as defined in claim 1, wherein the fifth lens group includes a negative lens, a positive lens, a negative lens and a positive lens that are arranged from the magnification side.

6. A zoom lens for projection, as defined in claim 5, wherein the negative lens, the positive lens, the negative lens, and the positive lens in the fifth lens group form two cemented lenses, each of which is composed of a negative lens and a positive lens.

7. A zoom lens for projection, as defined in claim 1, wherein the first lens group includes at least one aspheric surface.

8. A projection-type display device comprising:
    a light source;
    a light bulb;
    an illumination optical unit that guides a light beam output from the light source to the light bulb; and
    a zoom lens for projection, as defined in claim 1, the reduction side of the zoom lens being telecentric, wherein the light beam output from the light source is modulated by the light bulb, and projected onto a screen by the zoom lens for projection.

* * * * *